US012701480B2

(12) United States Patent
Park et al.

(10) Patent No.: US 12,701,480 B2
(45) Date of Patent: Aug. 4, 2026

(54) METHOD AND DEVICE FOR PERFORMING COMMUNICATION BY DISTRIBUTED UNIT IN WIRELESS COMMUNICATION SYSTEM

(71) Applicant: SAMSUNG ELECTRONICS CO., LTD., Suwon-si (KR)

(72) Inventors: Hanjung Park, Suwon-si (KR); Joonhwan Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 326 days.

(21) Appl. No.: 18/240,869

(22) Filed: Aug. 31, 2023

(65) Prior Publication Data

US 2024/0073764 A1 Feb. 29, 2024

Related U.S. Application Data

(63) Continuation of application No. PCT/KR2023/012434, filed on Aug. 22, 2023.

(30) Foreign Application Priority Data

Aug. 31, 2022 (KR) ........................ 10-2022-0110331
Oct. 26, 2022 (KR) ........................ 10-2022-0139663

(51) Int. Cl.
*H04W 36/08* (2009.01)
*H04W 36/00* (2009.01)
(Continued)

(52) U.S. Cl.
CPC ..... *H04W 36/087* (2023.05); *H04W 36/0072* (2013.01); *H04W 36/304* (2023.05); *H04W 76/27* (2018.02)

(58) Field of Classification Search
None
See application file for complete search history.

(56) References Cited

U.S. PATENT DOCUMENTS 11,546,236 B2 1/2023 Novlan et al.
11,582,642 B2 2/2023 Jang et al.
(Continued)

FOREIGN PATENT DOCUMENTS

KR 10-2013-0134256 A 12/2013
KR 10-2021-0086357 A 7/2021
WO 2022/094510 A1 5/2022

OTHER PUBLICATIONS

Technical White Paper, Virtualized RAN—vol. 2, Samsung, Apr. 2021, 16 pages.
(Continued)

*Primary Examiner* — Mohammad S Adhami
(74) *Attorney, Agent, or Firm* — Sughrue Mion, PLLC

(57) ABSTRACT

A method, performed by a first distributed unit (DU), of performing communication in a wireless communication system, includes obtaining inter-DU interface configuration information for connection to a second DU; performing the connection to the second DU based on the inter-DU interface configuration information; obtaining information about a throughput of data of at least one radio unit (RU) connected to the first DU based on information about the at least one RU connected to the first DU; selecting at least one target RU based on the information about the throughput of data of the at least one RU; and performing migration of the at least one target RU from the first DU to the second DU.

20 Claims, 13 Drawing Sheets

(51) Int. Cl.
  *H04W 36/30*       (2009.01)
  *H04W 76/27*       (2018.01)

(56)               References Cited

U.S. PATENT DOCUMENTS

| | | | |
|---|---|---|---|
| 12,010,739 | B2 | 6/2024 | Akl et al. |
| 2019/0342809 | A1 | 11/2019 | Kim |
| 2021/0266796 | A1 | 8/2021 | Majmundar et al. |
| 2021/0274406 | A1 | 9/2021 | Ode et al. |
| 2021/0345233 | A1 | 11/2021 | Singh et al. |
| 2021/0399962 | A1 | 12/2021 | Novlan et al. |
| 2022/0030643 | A1 | 1/2022 | Oak et al. |
| 2022/0086672 | A1 | 3/2022 | Abedini et al. |
| 2022/0117007 | A1 | 4/2022 | Akl et al. |
| 2022/0159510 | A1 | 5/2022 | Jang et al. |
| 2022/0182871 | A1 | 6/2022 | Na et al. |
| 2022/0248299 | A1 | 8/2022 | Murasame et al. |
| 2022/0272594 | A1 * | 8/2022 | Anderson ............. H04W 24/02 |
| 2022/0322102 | A1 * | 10/2022 | Bhaskaran ............ H04W 16/14 |

OTHER PUBLICATIONS

3rd Generation Partnership Project; Technical Specification Group Radio Access Network; NR; NR and NG-RAN Overall Description; Stage 2 (Release 15), 3GPP TS 38.300, V15.1.0, Mar. 2018, 72 pages.

3rd Generation Partnership Project; Technical Specification Group Radio Access Network; NG-RAN Architecture Description; (Release 17), 3GPP TS 38.401, V17.1.1, Jul. 2022, 122 pages.

Ankush Singla et al., "Protecting the 4G and 5G Cellular Paging Protocols against Security and Privacy Attacks", sclendo, Proceedings on Privacy Enhancing Technologies, Jan. 2020, 17 pages.

Spreadtrum Communications, Discussion on L1/L2 based inter-cell mobility, 3GPP TSG-RAN WG2 Meeting #119 electronic, Agenda item: 8.4.2.2, R2-2207681, Aug. 2022, 5 pages.

International Search Report and Written Opinion issued by the International Searching Authority on Nov. 22, 2023 for International Patent Application No. PCT/KR2023/012434 (PCT/ISA/220, PCT/ISA/210, and PCT/ISA/237).

Communication issued Sep. 4, 2025 by the European Patent Office in European Patent Application No. 23860762.6.

Fujitsu Limited: "General views on the design of 6G RAN standard", 3GPP workshop on 6G, Incheon, Korea, Mar. 10, 2025, Agenda Item: 4, 6GWS-250086, XP052736879. (39 pages total).

* cited by examiner

Throughput of inter-DU interface is increased for high throughput processing
Resource reduction effect is degraded due to high throughput processing

FIG. 9

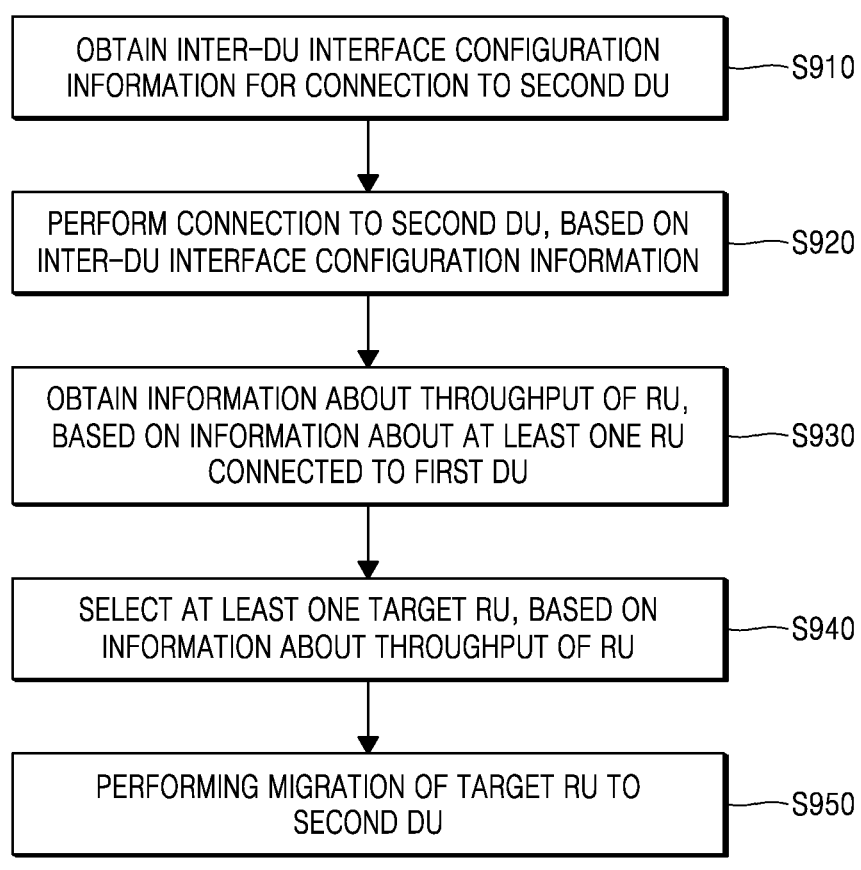

OBTAIN INTER-DU INTERFACE CONFIGURATION INFORMATION FOR CONNECTION TO SECOND DU —S910

PERFORM CONNECTION TO SECOND DU, BASED ON INTER-DU INTERFACE CONFIGURATION INFORMATION —S920

OBTAIN INFORMATION ABOUT THROUGHPUT OF RU, BASED ON INFORMATION ABOUT AT LEAST ONE RU CONNECTED TO FIRST DU —S930

SELECT AT LEAST ONE TARGET RU, BASED ON INFORMATION ABOUT THROUGHPUT OF RU —S940

PERFORMING MIGRATION OF TARGET RU TO SECOND DU —S950

METHOD AND DEVICE FOR PERFORMING COMMUNICATION BY DISTRIBUTED UNIT IN WIRELESS COMMUNICATION SYSTEM

CROSS-REFERENCE TO RELATED APPLICATIONS

This application is a continuation of PCT International Application No. PCT/KR2023/012434, which was filed on Aug. 22, 2023, and claims priority to Korean Patent Application No. 10-2022-0110331, filed on Aug. 31, 2022, and claims priority to Korean Patent Application No. 10-2022-0139663, filed on Oct. 26, 2022, in the Korean Intellectual Property Office, the disclosures of each of which are incorporated by reference herein their entirety.

BACKGROUND

1. Field

The disclosure relates to a wireless communication system, and more particularly, to a method and device for efficiently performing a wireless network function through dynamic scaling-in/out.

2. Description of Related Art

Considering the development of wireless communication from generation to generation, technologies have been developed mainly for services targeting humans, such as voice calls, multimedia services, data services, or any other wireless communication services. Connected devices, which are exponentially increasing after the commercialization of $5^{th}$ generation (5G) communication systems, are expected to be connected to communication networks. Examples of devices connected to the network may include vehicles, robots, drones, home appliances, displays, smart sensors installed in various infrastructures, construction machines, and factory equipment. Mobile devices are expected to evolve into various form factors, such as augmented reality glasses, virtual reality headsets, and hologram devices. In the $6^{th}$ generation (6G) era, efforts are being made to develop improved 6G communication systems in order to provide various services by connecting hundreds of billions of devices and things. For this reason, 6G communication systems are referred to as "beyond 5G" systems.

In a 6G communication system predicted to be commercialized around 2030, a maximum data rate is tera (that is, 1,000 giga) bps, and a radio latency is 100 microseconds (μsec). That is, the 6G communication system will be 50 times as fast as 5G communication system and have ¹⁄₁₀ the radio latency thereof.

To achieve a high data rate and ultra low latency, the implementation of 6G communication systems in a terahertz band (e.g., a band of 95 GHz to 3 THz) is under consideration. In the terahertz band, path loss and atmospheric absorption are serious, compared with a millimeter wave (mmWave) band introduced in 5G. Therefore, it is expected that the importance of technology capable of ensuring signal propagation distances (i.e., coverage) will increase. As the main technologies for securing the coverage required for these new technologies, radio frequency (RF) elements, antennas, new waveforms which have better coverage than orthogonal frequency division multiplexing (OFDM), beamforming, and multiple antenna transmission technologies, such as multiple-input and multiple-output (MIMO), full dimensional MIMO (FD-MIMO), array antenna, and large scale antenna need to be developed. In addition, to improve the coverage of terahertz band signals, new technologies, such as metamaterial-based lenses and antennas, high-dimensional spatial multiplexing technology using orbital angular momentum (OAM), and reconfigurable intelligent surface (RIS), are being discussed.

Furthermore, to improve frequency efficiency and system network efficiency, a full duplex technology for enabling uplink transmission and downlink transmission to use the same frequency resource at the same time, a network technology that integrates satellite and high-altitude platform stations (HAPS), etc., a network structure innovation technology that supports mobile base stations, etc. and enables network operation optimization, automation, etc., a dynamic spectrum sharing technology for collision avoidance based on spectrum usage prediction, an artificial intelligence (AI)-based communication technology that utilizes AI from a design stage and internalizes an end-to-end AI support function to realize system optimization, and a next-generation distributed computing technology that realizes services of complexity exceeding the limits of terminal computational capability by using ultra-high-performance communication and computing resources (mobile edge computing (MEC), cloud, etc.) are being developed in a 6G communication system. In addition, attempts to further strengthen connectivity between devices, further optimize networks, accelerate softwareization of network entities, and increase the openness of wireless communications are continuously made through the design of new protocols to be used in 6G communication systems, the implementation of hardware-based security environments, the development of mechanisms for the safe use of data, and the development of technologies on how to maintain privacy.

Due to the research and development of such 6G communication systems, it is expected that the next hyper-connected experience will become possible through the hyper-connectivity of the 6G communication system that includes not only the connection between things but also the connection between people and things. For example, it is expected that enhanced services, such as true immersive extended reality (XR), high-fidelity mobile hologram, and digital replica, will be provided through 6G communication systems. Furthermore, because services such as remote surgery, industrial automation, and emergency response through security and reliability enhancement are provided through 6G communication systems, these services will be applied in various fields, such as industry, medical care, automobiles, and home appliances.

SUMMARY

According to an aspect of the disclosure, a method, performed by a first distributed unit (DU), of performing communication in a wireless communication system, includes: obtaining inter-DU interface configuration information for connection to a second DU; performing the connection to the second DU based on the inter-DU interface configuration information; obtaining information about a throughput of data of at least one radio unit (RU) connected to the first DU based on information about the at least one RU connected to the first DU; selecting at least one target RU based on the information about the throughput of data of the at least one RU; and performing migration of the at least one target RU from the first DU to the second DU.

The method may further include determining whether to perform migration of the at least one RU connected to the first DU based on information about a resource usage of the first DU, and the resource usage of the first DU may be determined based on at least one of a central processing unit (CPU) usage, a memory usage, or an Ethernet link usage.

The throughput of data of the at least one RU is determined based on a data transmission/reception size of a user equipment (UE) connected to the at least one RU.

The throughput of data of the at least one target RU may be less than or equal to a threshold throughput of data of an inter-DU interface.

A resource usage of the at least one target RU for the first DU may be greater than or equal to a resource usage threshold value, and the resource usage of the at least one target RU for the first DU may be determined based on the throughput of data of the at least one target RU.

The method may further include performing migration of at least one target UE to the second DU based on information about at least one of a radio resource control (RRC) state, a required migration time, or a quality of service (QoS) of at least one UE connected to the at least one target RU.

The required migration time of the at least one UE connected to the at least one target RU may be determined based on at least one of UE context size information, radio link control (RLC) buffer size information, or inter-DU network capacity information.

The performing migration the at least one target UE may include, based on the RRC state of a UE connected to the at least one target RU corresponding to an idle state or an inactive state, migrating the UE corresponding to the idle state before another UE corresponding to the inactive state.

The migrating the at least one target UE may include, based on the RRC state of a UE connected to the at least one target RU corresponding to an inactive state, migrating the UE corresponding to the inactive state from the first DU to the second DU based on a paging signal period and the required migration time.

The migrating the at least one target UE may include, based on a determination that the RRC state of a UE connected to the at least one target RU corresponds to an active state, migrating the UE having the required migration time less than or equal to a threshold time, and the threshold time may be determined based on a maximum number of retransmission requests for a RLC layer and a waiting time for each retransmission request.

The method may further include, after a configured time has elapsed, migrating a UE, among a plurality of UEs connected to the at least one target RU, from the first DU to the second DU.

The method may further include, based on a required migration time of a first UE connected to the at least one target RU being greater than or equal to a threshold time, migrating one or more UEs other than the first UE among a plurality of UEs from the first DU to the second DU.

According to an aspect of the disclosure, a first distributed unit (DU) for performing communication in a wireless communication system, includes: a transceiver; and at least one processor operatively connected to the transceiver and configured to: obtain inter-DU interface configuration information for connection to a second DU; perform the connection to the second DU based on the inter-DU interface configuration information; obtain information about a throughput of data of at least one radio unit (RU) connected to the first DU based on information about the at least one RU connected to the first DU; select at least one target RU based on the information about the throughput of the data of at least one RU; and perform migration of the at least one target RU from the first DU to the second DU.

The at least one processor may be further configured to: determine whether to perform migration of the at least one RU connected to the first DU based on information about a resource usage of the first DU; and determine the resource usage of the first DU based on at least one of a central processing unit (CPU) usage, a memory usage, or an Ethernet link usage.

The throughput of the data of at least one RU may be determined based on a data transmission/reception size of a user equipment (UE) connected to the at least one RU.

The throughput of data of the at least one target RU may be less than or equal to a threshold throughput of an inter-DU interface.

A resource usage of the at least one target RU for the first DU may be greater than or equal to a resource usage threshold value, and the resource usage of the at least one target RU for the first DU may be determined based on a throughput of data of the at least one target RU.

The at least one processor may be further configured to perform the migration of at least one target UE from the first DU to the second DU based on information about at least one of a radio resource control (RRC) state, a required migration time, or a quality of service (QoS) of at least one UE connected to the at least one target RU.

The required migration time of the at least one UE connected to the at least one target RU may be determined based on at least one of UE context size information, radio link control (RLC) buffer size information, or inter-DU network capacity information.

Based on a RRC state of a UE connected to the at least one target RU corresponding to an idle state or an inactive state, the UE corresponding to the idle state may be migrated before another UE corresponding to an inactive state.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram for describing a scaling-in/out scenario of distributed unit (DU) according to a DU traffic change, according to one or more embodiments of the disclosure according to one or more embodiments;

FIG. 5A is a diagram for describing an initial access procedure of a user equipment (UE) according to one or more embodiments;

FIG. 9 is a flowchart of a method of performing RU migration from a first DU to a second DU, according to one or more embodiments of the disclosure.

DETAILED DESCRIPTION

Figure 1A:
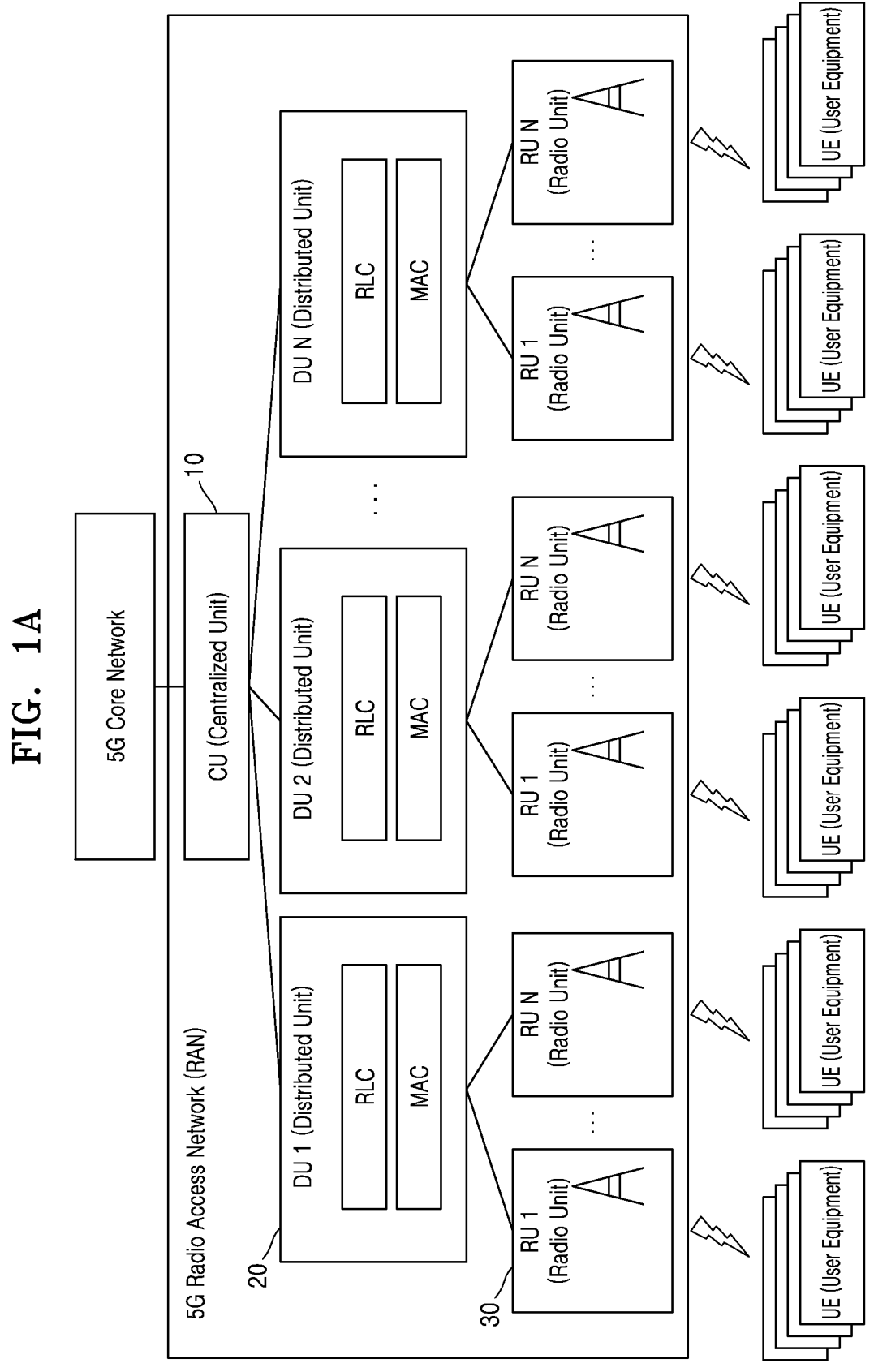
FIG. 1A is a diagram for describing a structure of a radio access network (RAN) according to one or more embodiments.

Throughout the disclosure, the expression "at least one of a, b or c" indicates only a, only b, only c, both a and b, both a and c, both b and c, or all of a, b, and c.

Hereinafter, embodiments of the disclosure will be described in detail with reference to the accompanying drawings.

As the present description allows for various changes and numerous embodiments of the disclosure, certain embodiments of the disclosure will be illustrated in the drawings and described in detail in the written description. However, this is not intended to limit the embodiments of the disclosure, and it will be understood that the disclosure includes all modifications, equivalents, and substitutes falling within the spirit and scope of various embodiments of the disclosure.

In describing embodiments of the disclosure, when the detailed description of the relevant known functions or configurations is determined to unnecessarily obscure the gist of the disclosure, the detailed description thereof may be omitted herein. Furthermore, numbers (e.g., first, second, etc.) used in the description of the specification are merely identification symbols for distinguishing one element from another.

As for the terms as used in embodiments of the disclosure, common terms that are currently widely used are selected as much as possible while taking into account the functions of the disclosure. However, the terms may vary depending on the intention of those of ordinary skill in the art, precedents, the emergence of new technology, and the like. Furthermore, in a specific case, there are also terms arbitrarily selected by the applicant. In this case, the meaning of the terms will be described in detail in the description of embodiments of the disclosure. Therefore, the terms as used herein should be defined based on the meaning of the terms and the description throughout the disclosure rather than simply the names of the terms.

The scope of the disclosure may be defined by the appended claims rather than the detailed description. Various features stated in one claim category (e.g., a method claim) of the disclosure may also be claimed in other claim categories (e.g., a system claim). In addition, one or more embodiments of the disclosure may include various combinations of individual features within the claims as well as combinations of features specified in the appended claims. All changes or modifications derived from the meaning and scope of the claims and equivalent concepts thereof should be construed as falling within the scope of the disclosure.

Furthermore, when one element is referred to as being "connected" or "coupled" to another element, the one element may be directly connected or coupled to the other element, but it will be understood that the elements may be connected or coupled to each other via an intervening element therebetween unless otherwise stated. Furthermore, when one element is referred to as being "directly connected" or "physically connected" to another element, it will be understood that the one element may be "electrically connected to" the other element with an intervening element therebetween. Throughout the disclosure, the terms "transmit," "receive," and "communicate" may include both direct communication and indirect communication. Throughout the disclosure, the expression "a portion includes a certain element" means that a portion further includes other elements rather than excludes other elements unless otherwise stated.

Furthermore, an element represented by "unit," "module," etc. in the disclosure may be one element in which two or more elements are combined, or may be divided into two or more element for each more subdivided function. These functions may be implemented as hardware or software, or may be implemented as a combination of hardware and software. Furthermore, each of the elements to be described below may additionally perform, in addition to the main function thereof, some or all of the functions that other elements are responsible for, and some of the main functions that the respective elements are responsible for may be dedicated by other elements.

The singular forms as used herein are intended to include the plural forms as well unless the context clearly indicates otherwise. All terms including technical or scientific terms as used herein have the same meaning as commonly understood by those of ordinary skill in the art.

Throughout the disclosure, the term "or" is inclusive and not exclusive unless otherwise stated. Therefore, the expression "A or B" may indicate "A," "B," or "both A and B" unless the context clearly indicates otherwise. Throughout the disclosure, the expression "at least one of" or "one or more of" refer to a case where different combinations of one or more of the listed items may be used, or only one of the listed items is required. For example, the expression "at least one of A, B, and C" may include only A, only B, only C, A and B, A and C, B and C, or all of A, B, and C.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions to be executed through the processor of the computer or other programmable data processing apparatus generate modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded in the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Furthermore, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

Hereinafter, embodiments of the disclosure will be described with reference to the accompanying drawings, so that those of ordinary skill in the art may easily carry out the disclosure. However, the disclosure may be implemented in various different forms and is not limited to the embodiments described herein. In order to clearly explain the disclosure, parts irrelevant to the description are omitted in the drawings, and similar reference numerals are assigned to similar parts throughout the specification.

Furthermore, although a long-term evolution (LTE), LTE-A, LTE Pro, or $5^{th}$ generation (5G) system is described below as an example, the embodiments of the disclosure may also be applied to other communication systems having technical backgrounds or channel forms similar thereto. For example, 5G-Advance or $6^{th}$ generation (6G) (beyond 5G), which has been developed after 5G mobile communication technology (NR), may be included, and the 5G may be a concept including the existing LTE, LTE-A, and other similar services. Furthermore, the disclosure may also be applied to other communication systems through some modifications without departing from the scope of the disclosure.

Terms as used herein are briefly described, and one or more embodiments of the disclosure are described in detail.

Terms as used herein are those defined by taking into account the functions in the disclosure, but the terms may vary depending on the intention of users or those of ordinary skill in the art, precedents, or the like. Therefore, the definitions should be made based on the contents throughout the specification.

disclosure, a base station is configured to perform resource allocation of a user equipment (UE), and may be at least one of a gNode B, an eNode B, a Node B (or xNode B (x is an alphabet including g and e)), a base station (BS), a radio access unit, a base station controller, a satellite, an airborn, or a node on a network, but the disclosure is not limited thereto. The base station in the disclosure may refer to a base station itself, a cell, or a radio unit (RU) according to interpretation, and a target for exchanging messages with the UE may be a distributed unit (DU) or a centralized unit (CU) according to a structure.

Furthermore, in the disclosure, the UE may include a mobile station (MS), a cellular phone, a smartphone, a computer, a vehicle, a satellite, or a multimedia system capable of performing a communication function.

Furthermore, in the disclosure, the cell may represent an area covered by one base station in wireless communication. Cells may be classified into mega cells, macro cells, micro cells, and pico cells according to sizes thereof. However, as understood by one of ordinary skill in the art, any type of suitable cell may be used in the embodiments of the disclosure.

Furthermore, in the disclosure, the DU may be connected to the RU and the CU and execute some of radio link control (RLC), medium access control (MAC), and physical (PHY) layers. In one or more embodiments of the disclosure, a virtualized DU may be included.

Furthermore, in the disclosure, the CU may include radio resource control (RRC), service data adaptation protocol (SDAP), and packet data convergence protocol (PDCP) layers. In one or more examples, one CU may manage one or more DUs, and may be connected to the one or more DUs through an F1 interface. In one or more embodiments of the disclosure, a virtualized CU may be included.

Furthermore, in the disclosure, the RU may convert a radio signal into a digital signal for the purpose of transmission through a packet network.

In addition, in the disclosure, a downlink (DL) is a radio transmission path through which the base station transmits data or a control signal to the UE. For example, in the LTE system, the DL may employ an orthogonal frequency division multiplexing (OFDM) scheme.

In addition, in the disclosure, an uplink (UL) refers to a radio transmission path through which the UE transmits data or a control signal to the base station. For example, in the LTE system, the UL may employ a single carrier frequency division multiplexing access (SC-FDMA) scheme.

Furthermore, in the disclosure, a packet refers to a unit for transmitting data or control-related signals. The packet may include DL or UL data or control-related signals.

According to one or more embodiments, scale-in may refer to increasing an amount of available resources, such as increasing the number of DUs or servers connected to the DUs, and scale-out may refer to reducing the amount of available resources, such as reducing the number of DUs or servers connected to the DUs.

The term referring to broadcast information, the term referring to control information, the term related to a communication coverage, the term referring to a state change (e.g., events), and the term referring to network entities, the term referring to messages, the terms referring to elements of a device, etc. as used herein are used for convenience of description. Therefore, the disclosure is not limited to the terms to be described below, and other terms referring to an equivalent technical meaning may be used.

For convenience of description, the terms and names defined in the $3^{rd}$ generation partnership project long term evolution (3GPP) standard or the terms and names modified based thereon are used herein. However, the disclosure is not limited by the terms and names and may be equally applied to wireless communication systems conforming to other standards. Although one or more embodiments of the disclosure will be described below with reference to a 5G wireless communication technology as an example, one or more embodiments of the disclosure may also be applied to other wireless communication systems having technical backgrounds or channel forms similar thereto. As another example, the embodiments of the disclosure may be applied to LTE or LTE-A, which is a wireless communication system prior to NR, and may also be applied to a wireless communication system developed after NR. Furthermore, it will be understood by those of ordinary skill in the art that the embodiments of the disclosure may also be applied to other wireless communication systems through partial modifications without departing from the scope of the disclosure.

The embodiments of the disclosure may also be applied to other wireless communication systems through modifications.

FIG. 1A is a diagram for describing a structure of a radio access network (RAN) according to one or more embodiments.

Referring to FIG. 1A, the RAN is a network that supports radio access to UEs, and may be regarded as a set of base stations. The RAN may be divided into a CU 10, a DU 20, and a RU 30. In a topology of an existing RAN, the RU, the DU, and the CU may be provided at a ratio of N:M:1 ((N≥M≥1)). In one or more examples, a cell corresponds to an area covered by a base station in a wireless communication system, and at least one cell may exist per base station.

The CU 10 may transmit or receive a signal to or from the DU 20 through an F1 interface. One CU 10 may be connected to a plurality of DUs 20. However, in case that the number of DUs 20 is dynamically changed, the F1 interface may be violated.

The DU 20 may process a signal received from the RU 30 and transmit the processed signal to the CU 10 through the F1 interface. Furthermore, the DU 20 may receive a signal from the CU 10 through the F1 interface and process the received signal or transmit the signal to the RU 30. The DU 20 may perform various RAN functions for signal processing. The RAN functions may include a RLC layer function, a MAC layer function, or a higher physical (H-PHY) layer function. The RAN functions are not limited to the examples described above, and may include any suitable RAN function known to one of ordinary skill in the art.

Figure 1B:
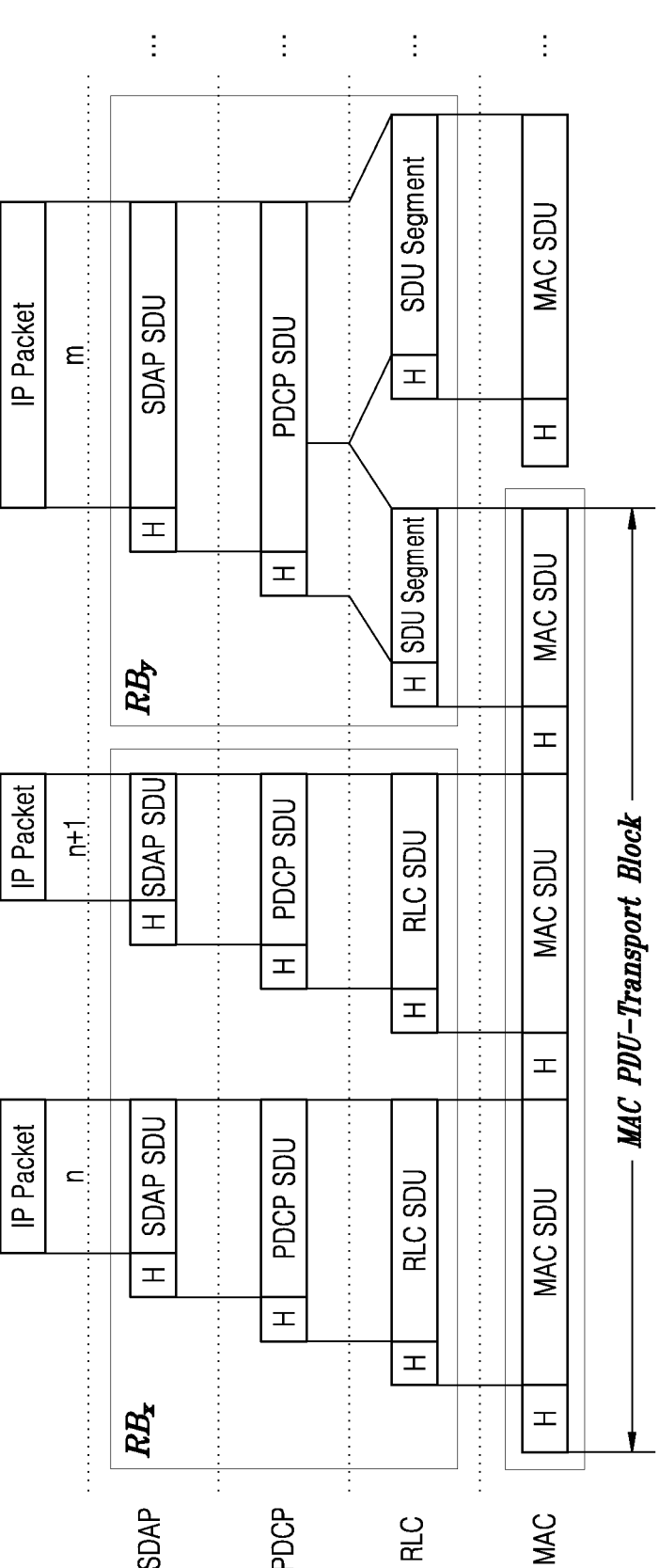
FIG. 1B is a diagram for describing a structure of a radio protocol for a new radio (NR) according to one or more embodiments.

FIG. 1B is a diagram for describing a structure of a radio protocol for a new radio (NR).

In a UE and a base station, the radio protocol may include a SDAP, a PDCP, a RLC, and a MAC.

Hereinafter, the functions of a SDAP layer, a PDCP layer, a RLC layer, a MAC layer, and a PHY layer will be described.

The main functions of the SDAP may include one or more of the following functions:

Transfer of user plane data

Mapping between a quality of service (QoS) flow and a data radio bearer (DRB) for both DL and UL Marking QoS flow ID in both DL and UL packets Reflective QoS flow to DRB mapping for the UL SDAP packet data units (PDUs)

In regard to the SDAP layer entity, the UE may receive an RRC message to configure whether to use the header of the SDAP layer entity or whether to use the function of the SDAP layer entity for each PDCP layer entity, each bearer, or each logical channel. In case that the SDAP header is configured, the UE may use a 1-bit non-access stratum (NAS) reflective QoS indicator and a 1-bit access stratum (AS) reflective QoS indicator of the SDAP header to indicate the UE to update or reconfigure mapping information between a QoS flow and a data bearer for UL and DL. The SDAP header may include QoS flow ID information indicating QoS. The QoS information may be used as data processing priority, scheduling information, and like for supporting seamless services.

The main functions of the PDCP may include one or more of the following functions:

Header compression and decompression: Robust header compression (ROHC) only

Transfer of user data

In-sequence delivery of upper layer PDUs

Out-of-sequence delivery of upper layer PDUs

PDCP PDU reordering for reception

Duplicate detection of lower layer service data units (SDUs)

Retransmission of PDCP SDUs

Ciphering and deciphering

Timer-based SDU discard in uplink

In one or more examples, the reordering function of the PDCP entity may refer to a function of reordering PDCP PDUs received from the lower layer in sequence based on a PDCP sequence number (SN). The reordering function of the PDCP entity may include a function of transmitting data to the upper layer in reordered order, a function of immediately transmitting data without considering the order, a function of reordering PDCP PDUs and recording lost PDCP PDUs, a function of reporting the state of the lost PDCP PDUs to a sender, and a function of requesting retransmission of the lost PDCP PDUs.

The functions of the RLC layer may include at least one or more of the following functions:

Transfer of upper layer PDUs

In-sequence delivery of upper layer PDUs

Out-of-sequence delivery of upper layer PDUs

Error correction through automatic repeat request (ARQ)

Concatenation, segmentation and reassembly of RLC SDUs

Re-segmentation of RLC data

Reordering of RLC data

Duplicate detection

Protocol error detection

RLC SDU discard

RLC re-establishment

In one or more examples, the in-sequence delivery function of the RLC layer may refer to a function of transmitting RLC SDUs received from the lower layer to the upper layer in sequence. The in-sequence delivery function of the RLC layer may include a function of, in case that one RLC SDU is received after being segmented into a plurality of RLC SDUs, reassembling and transmitting the segmented RLC SDUs. Furthermore, the in-sequence delivery function may include at least one of a function of reordering the received RLC PDUs based on an RLC SN or a PDCP SN, a function of reordering the RLC PDUs and recording the lost RLC PDUs, or a function of reporting the state of the lost RLC PDUs to the sender. Furthermore, the in-sequence delivery function may include a function of requesting retransmission of the lost RLC PDUs. The in-sequence delivery function may include a function of, in case that there is the lost RLC SDU, transmitting only RLC SDUs up to before the lost RLC SDU to the upper layer in sequence. Furthermore, the in-sequence delivery function may include a function of, in case that there is the lost RLC SDU but a certain timer has expired, transmitting all RLC SDUs received before the start of the timer to the upper layer in sequence, or a function of, in case that there is the lost RLC SDU but a certain timer has expired, transmitting all RLC SDUs received so far to the upper layer in sequence.

In one or more examples, the RLC layer may process RLC PDUs in the order of reception and transmit the processed RLC PDUs to the PDCP layer, regardless of the sequence order. In case that segments are received, the RLC layer may concatenate the received segments to segments stored in a buffer or segments to be received later to reconfigure the segments into one complete RLC PDU, and transmit the RLC PDU to the PDCP layer. The NR RLC layer may not include the concatenation function, and the concatenation function may be performed by the MAC layer, or may be replaced with the multiplexing function of the MAC layer.

The functions of the MAC layer may include at least one or more of the following functions:

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

Multimedia broadcast multicast service (MBMS) identification

Transport format selection

Padding

The functions of the PHY layer may perform at least one or more of the following functions:

Data transmission and reception using electric signals

Channel coding/decoding

Modulation/demodulation

Power control

Cell search

In one or more examples, the PHY layer may channel-code and modulate data of the upper layer into OFDM symbols and transmit the OFDM symbols over a radio channel. Furthermore, the PHY layer may demodulate and channel-decode the OFDM symbols received over the radio channel and transmit the demodulated and channel-decoded OFDM symbols to the upper layer.

In one or more examples, The RU 30 may transmit a signal to the DU 20 through a fronthaul interface. Furthermore, the RU 30 may receive a signal from the DU 20 through the fronthaul interface. The fronthaul may be a network part connecting the RU 30 of the cell site to the DU 20, and may perform digital signal processing (DSP), power amplification, and filtering functions.

In order to efficiently use the resources of the DUs 20, the disclosure provides a method of dynamically managing the number of DUs 20 without violating the F1 interface. The CU 10, the DU 20, and the RU 30 described below may operate in the virtualized RAN. The virtualization refers to a technology capable of expanding resources available in a single device by integrating and managing multiple physical resources.

Figure 2:
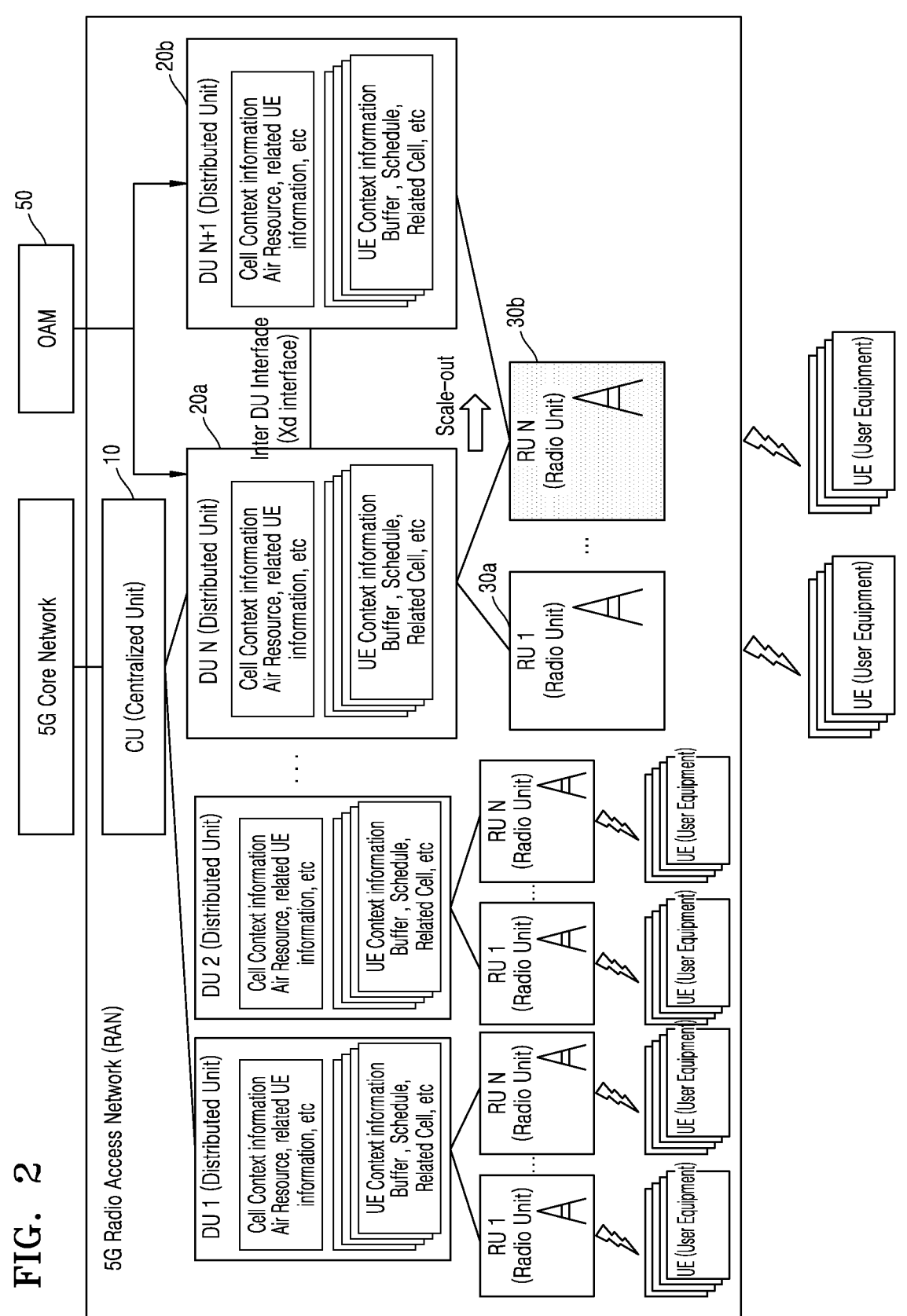
FIG. 2 is a diagram for describing a structure of a RAN after dynamic scaling, according to one or more embodiments of the disclosure according to one or more embodiments.

FIG. 2 is a diagram for describing a structure of a RAN after dynamic scaling, according to one or more embodiments of the disclosure.

Referring to FIG. 2, the RAN is a network that supports radio access to UEs, and may include a set of base stations. In one or more embodiments of the disclosure, the RAN may be divided into a CU 10, a DU 20, and a RU 30.

In the disclosure, in order to efficiently use the resources of the DU 20, scaling-in/out may be performed to dynamically allocate DUs as many resources as necessary. In a state where the CU 10 is connected to N DUs 20, an (N+1)th DU 20b may be added in case that scaling-out of DUs is required based on traffic information or resource information. In one or more embodiments of the disclosure, whether scaling-out or scaling-in of the DUs is required may be identified by operation administration maintenance (OAM) 50. The OAM 50 may refer to O&M, OAM&P, OAMP, a scaling agent, or a scaling controller (SC), but the disclosure is not limited thereto.

In one or more embodiments of the disclosure, the OAM 50 may determine whether to perform scaling-in or scaling-out by comparing traffic information with resource information of the DU 20. For example, in case that the resource throughput of the DU 20 is greater than a preset value, scaling-out may be performed. In one or more examples whether to perform scaling-in or scaling-out may be determined by comparing the difference between the resource throughput of the DU and the amount of traffic with a preset value. Hereinafter, for convenience of description, the existing DU is referred to as a first DU 20a, and the DU added by scaling-out is referred to as a second DU 20b.

In one or more embodiments of the disclosure, the first DU 20a may be referred to as a source DU, a master DU, or a DU N, and may include a virtualized DU (vDU). In one or more embodiments of the disclosure, the second DU 20b may be referred to as a target DU, a slave DU, or a DU N+1, and may include a vDU. In one or more embodiments of the disclosure, the OAM 50 may periodically obtain resource information of the first DU 20a. The OAM 50 may activate the second DU 20b for scaling-out, based on the resource information of the first DU 20a.

The first DU 20a may determine at least one RU 30b to be connected to the second DU 20b among one or more RUs 30a and 30b connected to the first DU 20a according to the scaling-out of the second DU 20b. Although two RUs 30a and 30b are illustrated in FIG. 2, as understood by one of ordinary skill in the art, the RAN may include more than two RUs. The determined RU 30b may transmit and receive packets to and from the second DU 20b through the fronthaul interface. In one or more embodiments of the disclosure, the RU 30b may release the connection to the first DU 20a. In addition, when scaling-in is performed, the fronthaul interface may be reconfigured between the RU 30b and the first DU 20a.

In one or more embodiments of the disclosure, an inter-DU interface may be configured between the first DU 20a and the second DU 20b. In one or more examples, the inter-DU interface may refer to an interface for transmission and reception of packets between DUs. The inter-DU interface may be referred to as, for example, an Xd interface and a DU-DU interface, and is not limited to the examples described above. Since the CU 10 may transmit and receive packets by using the IP of the connected DU based on the F1 interface configuration, information including an IP address of the dynamically added second DU 20b may not be obtained. Accordingly, the CU 10 may recognize up to N DUs that have been previously connected, but may not recognize the dynamically added second DU 20b. The second DU 20b may transmit and receive packets to and from the first DU 20a through the inter-DU interface by using an F1 splitter inside the DU.

The DUs 20 (20a and 20b) may include at least one of cell context information or UE context information. One RU may correspond to one cell context. In case that the DU is connected to one or more RUs, the DU may have one or more cell contexts. For example, in case that the DU has one RU, the DU may include one cell context, and in case that the DU has three RUs, the DU may include three cell contexts.

According to one or more embodiments, the cell context information may include at least one of cell-related information, such as the ID of the cell used by the base station, information related to the frequency used, sub-carrier spacing (SCS)-related information, random access (RA)-related information, radio resource information, or UE information related to the cell.

The UE context information may include at least one of UE state-related information, RLC entity-related information including a buffer, information to be used by the MAC when scheduling the UE, or cell information related to the UE. The UE context may include at least one of UE-specific context and buffer data of the RLC layer or UE-specific context and buffer data of the MAC layer.

Figure 3:
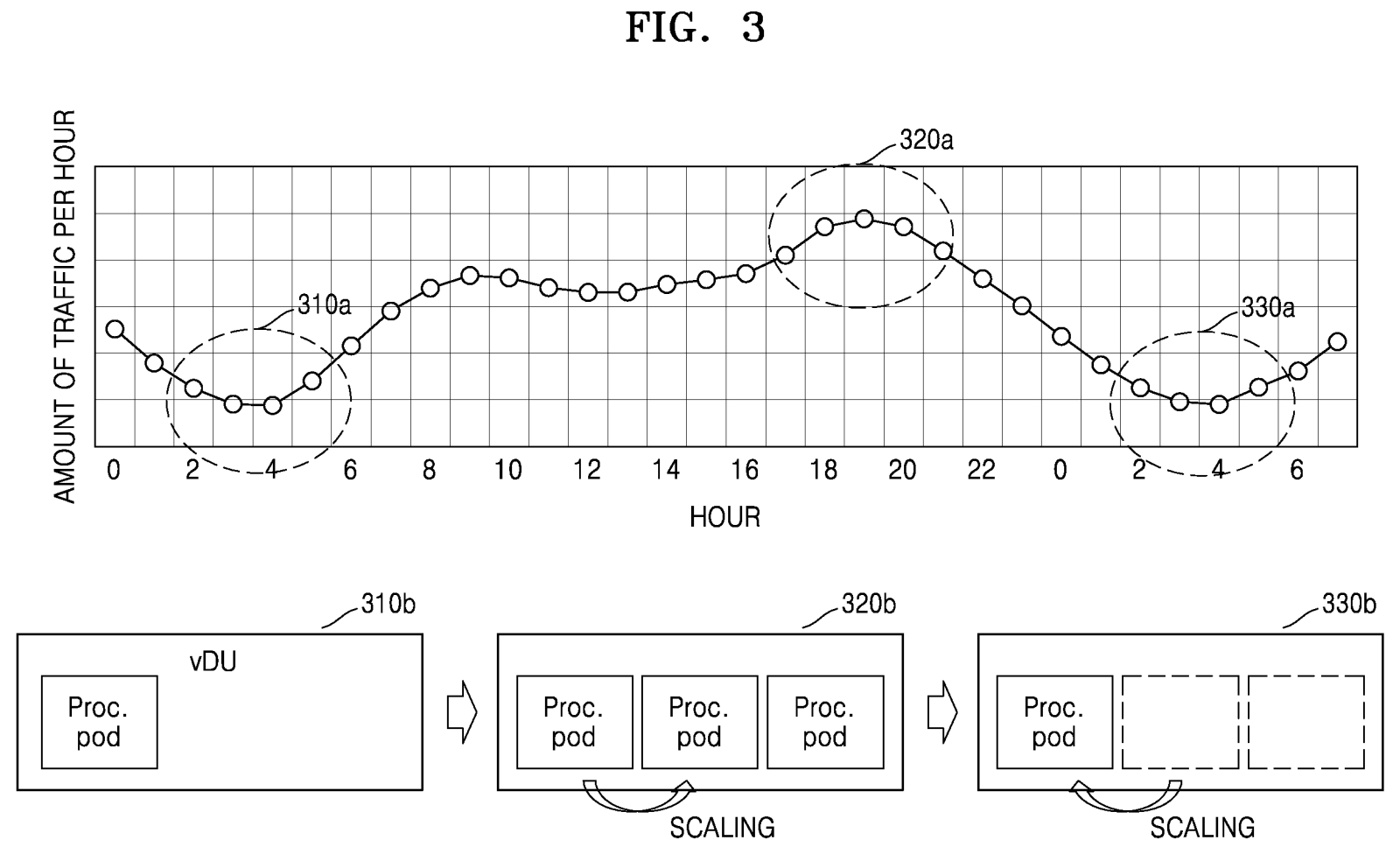

FIG. 3 is a diagram for describing a scaling-in/out scenario of a DU according to a DU traffic change, according to one or more embodiments of the disclosure.

FIG. 3 shows information about traffic generated by a plurality of base stations or CUs. Hereinafter, the traffic may correspond to a flow of packets or data passing through a communication network within a certain time.

In one or more embodiments of the disclosure, the traffic may include a data flow between a UE and a base station, and may be referred to as a data transmission rate per unit time, a data transmission/reception amount per unit time, and the like. Furthermore, traffic processing information may include traffic information about a plurality of base stations that generate traffic and resource information used to process traffic generated by the base stations. For example, traffic information may include a traffic processing rate per cell (e.g., bps), the number of UEs connected to the RU, a generated frequency band, and the like. Furthermore, in one or more embodiments of the disclosure, resource information may refer to a ratio of DUs used for traffic processing and a resource amount of DUs used for traffic processing. However, those described above are only examples, and the traffic information or the resource information is not limited to the examples described above. The resource usage of the DU may be determined or calculated based on at least one of central processing unit (CPU) usage, memory usage, or Ethernet link usage related to the network of the DU server.

In the case of the existing RAN system, the total resource amount of the DU is determined by the maximum amount of traffic that may enter the cell site connected to the DU one to one. However, because the amount of traffic per hour or time is not constant and changes as illustrated in FIG. 3, the efficiency of resources of the DU deteriorates. For example, the maximum amount of traffic per hour or time is observed in a section from 18:00 to 21:00 (320*a*). In the case of 3:00 to 5:00 (310*a*, 330*a*), only about 20% of the maximum amount of traffic per hour or time (320*a*) appears. The total amount of resources of the DU, which is excessive as compared to the amount of traffic, may be allocated. That is, the amount of resources of the DU that is allocated may be disproportionate to the amount of traffic passing through the DU.

Because the amount of traffic is not constant, a method of efficiently using resources of the DU is provided in the disclosure. For example, the disclosure proposes a method of dynamically and efficiently allocating to DUs as many resources as necessary, based on traffic information or resource information, without violating the F1 interface. A method of efficiently migrating RUs and UEs while reducing the occurrence of communication interruption of UEs connected to the Rus is proposed.

In one or more embodiments of the disclosure, the OAM 50 may obtain traffic information or resource information, and may identify whether the DU 20 is additionally connected, based on the obtained traffic information or resource information. In one or more embodiments of the disclosure, the OAM 50 may be an entity separate from the CU or the DU, or may be an entity that exists in the outside. Furthermore, the OAM 50 may identify the RU 30 connected to the DU 20 when the DU 20 is scaled in or out, and may provide information about the identified RU 30 to the DU 20.

For example, in the section 310*a* where the amount of traffic per hour or time is small, traffic may be processed with one DU (310*b*). In the section 320*a* where the amount of traffic per hour or time increases according to the traffic amount change, the number of DUs may be increased. For example, during the time period corresponding to section 320*a*, the total resource amount of the DUs may be increased through the scaling-out of the DUs (320*b*). The OAM 50 may determine the number of DUs to be scaled out, based on the obtained traffic information or resource information. At the time of scaling-out, the CU recognizes both the existing DU and the scaled-out DU as one, and thus, the scaled-out DU may transmit and receive packets to and from the CU through the existing DU and the inter-DU interface. Performance may be improved by sharing the load of the DU server.

In one or more embodiments of the disclosure, in the section 330*a* where the amount of traffic per hour or time decreases again, the OAM 50 may decrease the number of DUs. For example during the time period corresponding to section 330*a*, the OAM 50 may reduce the total resource amount of DUs through the scaling-in of the DUs (330*b*). According to the dynamic allocation of DU resources, the waste of DU resources may be prevented. In one or more embodiments of the disclosure, the OAM 50 may determine the number of DUs to be scaled in, based on the obtained traffic information or resource information. Furthermore, at least one RU connected to the DU to be scaled in may be connected to a DU that has been previously connected or a DU that is not scaled in. The scaling-in may save the resources of DUs and reduce power consumption.

Figure 4:
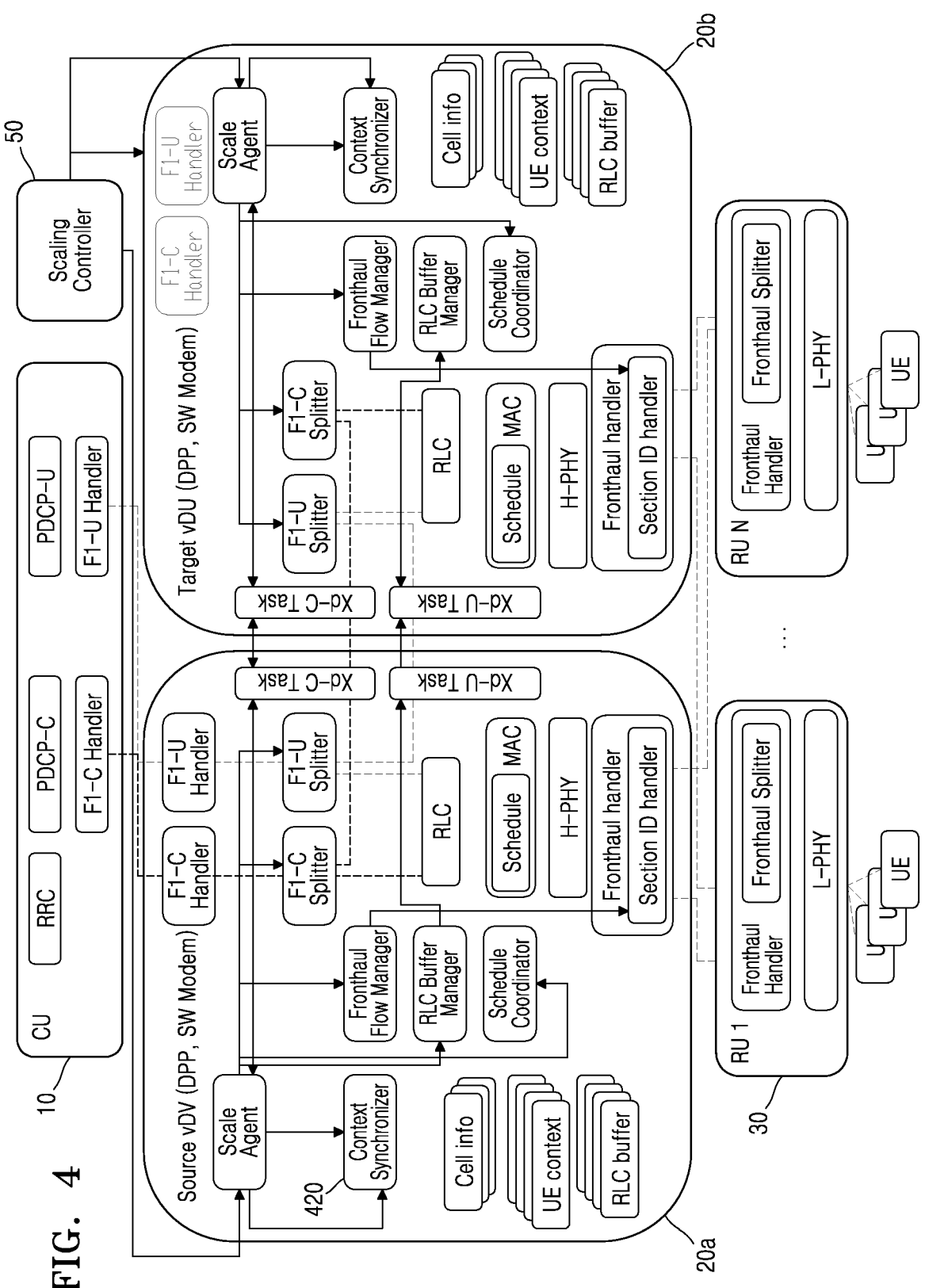
FIG. 4 is a diagram for describing an interface and a structure of a RAN after dynamic scaling, according to one or more embodiments of the disclosure according to one or more embodiments.

FIG. 4 is a diagram for describing an interface and a structure of a RAN after dynamic scaling, according to one or more embodiments of the disclosure.

Referring to FIG. 4, a CU 10 and a first DU 20*a* may be connected to each other through an F1 interface. A DU 20 and a RU 30 may be connected to each other through a fronthaul interface. The DU 20 may include an F1 handler that controls the F1 interface and RLC/MAC/H-PHY that perform wireless network communication functions.

The DU 20 may include at least one of cell context information, UE context information, or an RLC buffer. The DU 20 may include a context synchronizer 420 that performs RU migration or UE migration. The cell context information may be referred to as cell information.

The context synchronizer 420 may determine which RU to migrate and the migration order, based on the cell information and the UE context information in the DU 20. Furthermore, the context synchronizer 420 may determine which UE to migrate from a first DU 20*a* to a second DU 20*b* in the RU determined to migrate and the migration order.

The RU migration may be understood as transmission of information about the RU from the first DU 20*a* to the second DU 20*b*. In one or more embodiments of the disclosure, the information about the RU may be understood as information about the cell and may include at least one of cell context information 401 or UE context information 402.

In one or more embodiments of the disclosure, a CU and the DU may synchronize and manage the cell context and the UE context through the F1 interface. In one or more embodiments of the disclosure, the cell context and the UE context may include a cell context and a UE context of a RLC or a cell context and a UE context of a MAC. In one or more embodiments of the disclosure, data may be continuously processed because the second DU 20*b* has the cell context information and the UE context information. For example, if an interruption occurs with a first DU, the data may be continuously processed because a second DU has the cell context information and the UE context information.

In one or more examples, the RAN may support connection to one CU 10 for one DU 20, based on the F1 interface. The F1 handler of the DU 20 connected to the CU 10 may be activated to perform a connection based on the F1 interface. The F1 interface may include F1-C for control data and F1-U for user data. The structure of the F1 interface protocol is described in 3GPP TS 38.470.

In one or more examples, in the structure of the F1-C, a transport network layer is based on IP transport including stream control transmission protocol (SCTP) on top of IP, and an application layer signaling protocol may be referred to as F1 application protocol (F1AP). In the structure of the F1-U, the transport network layer is based on IP transport including UDP and GTP-U on top of IP.

On the F1 interface, the CU 10 may obtain information about the DU 20 and may manage the DU 20 based on the obtained IP information of the DU 20. Accordingly, in case that a DU is dynamically scaled out, as disclosed in one or more embodiments of the disclosure, a new DU may be assigned a new IP that is different from that of the existing DU.

In the RAN, the DU 20 may perform various RAN functions for signal processing. The RAN functions may include, for example, at least one of a RLC layer function, a MAC layer function, or an H-PHY layer function, but this is only an example, and the RAN functions are not limited to the examples described above. Specific network functions are described with reference to FIG. 1.

In one or more examples, according to scaling-out of DUs, the first DU 20a and at least one second DU 20b may be connected to each other through an inter-DU interface. The Inter-DU interface is an interface for transmission and reception of packets between the DUs 20a and 20b, and may be controlled by an F1 splitter and an inter-DU handler. In one or more embodiments of the disclosure, one or more second DUs 20b may be provided. In case that there are a plurality of second DUs 20b, the first DU 20a may configure the inter-DU interface with each of the second DUs 20b. The OAM 50 may determine an RU 30 to be connected to each of the second DUs 20b.

In one or more examples, the CU 10 may configure the F1 interface with the first DU 20a and may transmit and receive packets to and from the first DU 20a through the F1 interface. The first DU 20a may transmit IP information to the CU 10 along with a request for configuring the F1 interface, and the CU 10 may configure the F1 interface with the first DU 20a, based on the received IP information. The CU 10 may transmit and receive packets to and from the second DU 20b through the first DU 20a.

For example, the DL packet to be transmitted to the second DU 20b may be transmitted from the CU 10 to the first DU 20a and may be transmitted to the second DU 20b through the inter-DU interface by the F1 splitter. In one or more examples the UL packet may be transmitted from the second DU 20b to the first DU 20a through the inter-DU interface and then transmitted and/or forwarded to the CU 10. In one or more embodiments of the disclosure, the uplink packet from the second DU 20b may be merged with the uplink packet of the first DU 20a and then transmitted to the CU 10.

The first DU 20a may be connected to the CU 10 through the F1 interface, may be connected to the second DU 20b through the inter-DU interface, and may be connected to the RU 30 through the fronthaul interface. In one or more embodiments of the disclosure, based on the F1 interface, the connection between the CU 10 and the first DU 20a may be activated, and the direct connection between the CU 10 and the second DU 20b is not made. For example, the F1 handler of the first DU 20a may become active and perform the connection to the CU 10 based on the F1 interface. The F1 handler of the second DU may be maintained in an inactive state.

In one or more embodiments of the disclosure, the F1 splitter of the first DU 20a may transmit the packet to the destination according to the contents of the packet. For example, in the case of the DL packet received from the CU 10 through the F1 interface, the first DU 20a may directly process the DL packet or transmit the DL packet to the second DU 20b according to contents of data. In case that the DL packet is transmitted to the second DU 20b, the DL packet may be transmitted through the inter-DU interface by using the F1 splitter and the inter-DU handler. Furthermore, the F1 splitter may control the DU 20 to directly process the packet or transmit the packet to the RU 30 according to the contents of the packet.

In one or more embodiments of the disclosure, the inter-DU handler may configure the inter-DU interface between the DUs 20a and 20b, based on the obtained inter-DU interface configuration information. The Inter-DU interface configuration information may include F1 interface configuration information between the first DU 20a and the CU 10. Furthermore, the inter-DU handler may transmit and receive packets transmitted from the F1 splitter through the inter-DU interface.

In one or more examples, the first DU 20a and the RU 30 may be connected to each other through the fronthaul interface. The fronthaul interface may correspond to a network part that connects the DU to the RU and may perform DSP, power amplification, and filtering functions. The first DU 20a and the RU 30 may transmit and receive UL and/or DL packets through the fronthaul interface. In one or more embodiments of the disclosure, the OAM 50 may determine at least one RU to be connected to the DU according to scaling-out. The RU may configure the fronthaul interface with a new DU according to the scaling-out and transmit and receive packets.

The second DU 20b may be connected to the first DU 20a through the inter-DU interface and may be connected to the RU 30 through the fronthaul interface. The RU 30 may release the connection to the first DU 20a according to the scaling-out. Furthermore, the RU 30 may release the connection to the second DU 20b according to the scaling-in and may be reconnected to the first DU 20a.

In one or more embodiments of the disclosure, the F1 splitter of the second DU 20b may identify whether to directly process the packet in the second DU 20b or transmit the packet to the RU 30 according to the contents of the DL packet received from the first DU 20a. The packet transmission and reception from the second DU 20b to the RU 30 may be performed based on the fronthaul interface. The UL packet generated by the second DU 20b or received from the RU 30 may be transmitted to the first DU 20a through the inter-DU interface by using the F1 splitter.

In one or more embodiments of the disclosure, the OAM 50 may identify whether the connection to at least one second DU 20b is required based on at least one of the traffic information or the resource information. For example, in case that the amount of traffic is greater than the processing capacity of the first DU 20a, the OAM 50 may determine that the connection to the second DU 20b is required. In one or more embodiments of the disclosure, the second DU 20b may request inter-DU interface configuration information from the first DU 20a. The second DU 20b may configure the inter-DU interface with the first DU 20a, based on the inter-DU interface configuration information obtained in response to the request. The Inter-DU interface configuration information may include F1 interface configuration information between the first DU 20a and the CU 10.

At least one of the F1 splitters or Xd tasks (Xd-C task and Xd-U task) of the first DU 20a and the second DU 20b may disadvantageously generate overhead during RU migration. Therefore, as the throughput of the migrated RU increases, overhead generated in the corresponding component may increase. One or more embodiments of the disclosure proposes a method of reducing this overhead compared to the case of randomly performing RU migration. Details thereof will be described with reference to FIGS. 7A and 7B.

Figure 5A:
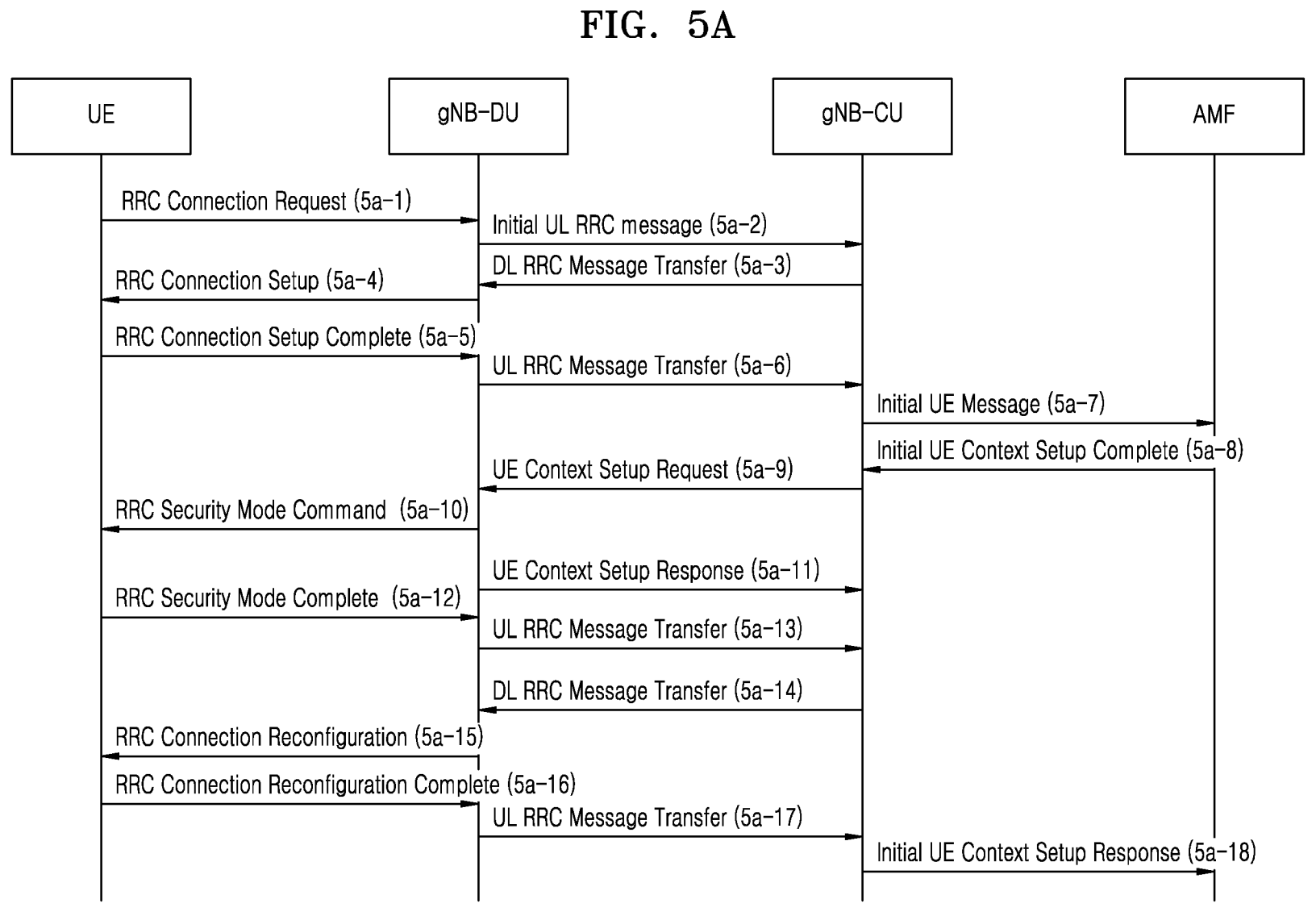

FIG. 5A is a diagram for describing an initial access procedure of a UE according to one or more embodiments.

In operation 5a-1, the UE may transmit an RRCSetupRequest message to a gNB-DU.

In operation 5a-2, the gNB-DU may transmit, to a gNB-CU, an initial UL RRC transfer message including the RRC message and corresponding lower layer configuration information for the UE in case that the UE is approved. In one or more embodiments of the disclosure, the initial UL RRC transfer message may include a C-RTI allocated by the gNB-DU. In case that the gNB-DU identifies the UE as a RedCapability UE during a random access procedure, an NR RedCap UE indication may be provided in the initial UL RRC transfer message.

In operation 5a-3, the gNB-CU may allocate a gNB-CU UE F1AP ID for the UE and generate an RRC configuration message toward the UE. In one or more embodiments of the disclosure, the RRC message may be encapsulated in a DL RRC transfer message.

In operation 5a-4, the gNB-DU may transmit an RRC configuration message to the UE.

In operation 5a-5, the UE may transmit an RRC connection setup complete message to the gNB-DU.

In operation 5a-6, the gNB-DU may encapsulate the RRC message in a UL RRC transfer message and transmit the encapsulated message to the gNB-CU.

In operation 5a-7, the gNB-CU may transmit an initial UE message to an AMF.

In operation 5a-8, the AMF may transmit an initial content setup request message to the gNB-CU.

In operation 5a-9, the gNB-CU may set the UE context of the gNB-DU by transmitting a UE context setup request message to the gNB-DU. In one or more embodiments of the disclosure, a SecurityModeCommand message may be encapsulated in the UE context setup request message. In case of NG-RAN sharing, the gNB-CU may include a serving PLMN ID (serving SNPN ID in case of SNPN).

In operation 5a-10, the gNB-DU may transmit a security mode command message to the UE.

In operation 5a-11, the gNB-DU may transmit a UE context setup response message to the gNB-CU.

In operation 5a-12, the UE may respond with a security mode complete message.

In operation 5a-13, the gNB-DU may encapsulate the RRC message in a UL RRC transfer message and transmit the encapsulated message to the gNB-CU.

In operation 5a-14, the gNB-CU may generate an RRC configuration message and encapsulate the generated RRC configuration message in a DL RRC transfer message.

In operation 5a-15, the gNB-DU may transmit an RRC configuration message to the UE.

In operation 5a-16, the UE may transmit an RRC configuration complete message to the gNB-DU.

In operation 5a-17, the gNB-DU may encapsulate the RRC message in a UL RRC transfer message and transmit the encapsulated message to the gNB-CU.

In operation 5a-18, the gNB-CU may transmit an initial context setup response message to the AMF.

Figure 5B:
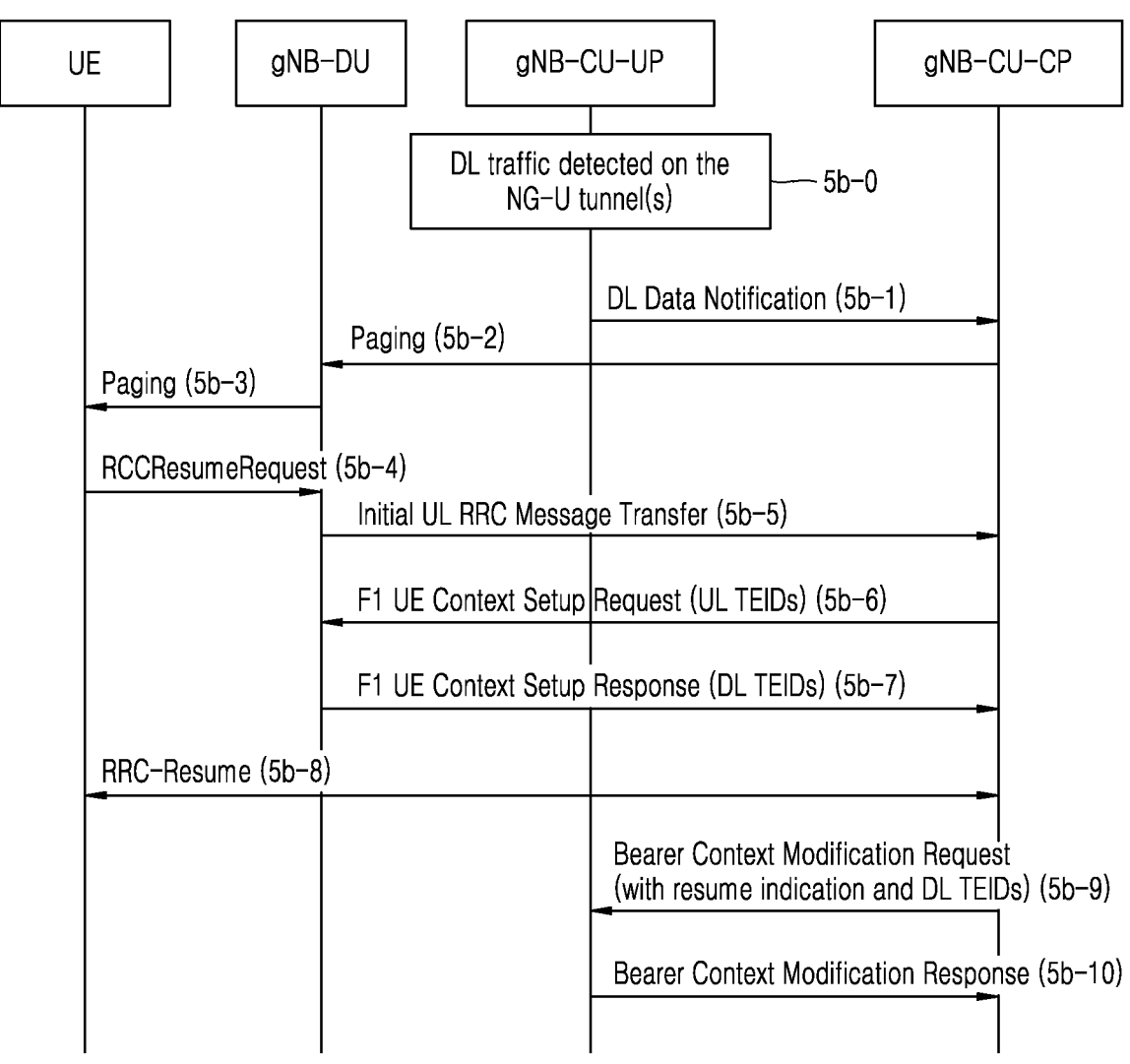
FIG. 5B is a diagram for describing a transition procedure from a radio resource control (RRC) inactive state to a RRC connected state according to one or more embodiments.

FIG. 5B is a diagram for describing a transition procedure from a RRC inactive state to a RRC connected state according to one or more embodiments.

In operation 5b-0, a gNB-CU-UP may receive DL data through a NG-U interface. DL traffic may be detected on the NG-U tunnel(s).

In operation 5b-1, the gNB-CU-UP may transmit a DL data notify message to a gNB-CU-CP.

In operation 5b-2, the gNB-CU-CP may transmit a paging message to a gNB-DU.

In operation 5b-3, the gNB-DU may transmit the paging message to a UE. In one or more examples, operation 5b-3 may be necessary only for DL data. In the case of UL data, operation 5b-3 may be omitted.

In operation 5b-4, the UE may transmit a RRCResumeRequest message upon arrival of UL data or RAN paging.

In operation 5b-5, the gNB-DU may transmit an initial UL RRC transfer message to the gNB-CU-CP.

In operation 5b-6, the gNB-CU-CP may generate a UE context to the gNB-DU by transmitting a UE context setup request message including the stored F1 UL tunnel endpoint identifiers (TEIDs).

In operation 5b-7, the gNB-DU may respond with a UE context setup response message including F1 DL TEIDs allocated to a DRB.

In operation 5b-8, the gNB-CU-CP and the UE may perform an RRC-resume procedure through the gNB-DU.

In operation 5b-9, the gNB-CU-CP may transmit a bearer context modification request message together with an RRC resume indication indicating that the UE is resuming from a RRC inactive state. The gNB-CU-CP may also include the F1 DL TEIDs received from the gNB-DU in operation 5b-7. Operations 5b-8 and 5b-9 may be performed in parallel.

In operation 5b-10, the gNB-CU-UP may respond with a bearer context modification response message.

Figure 6:
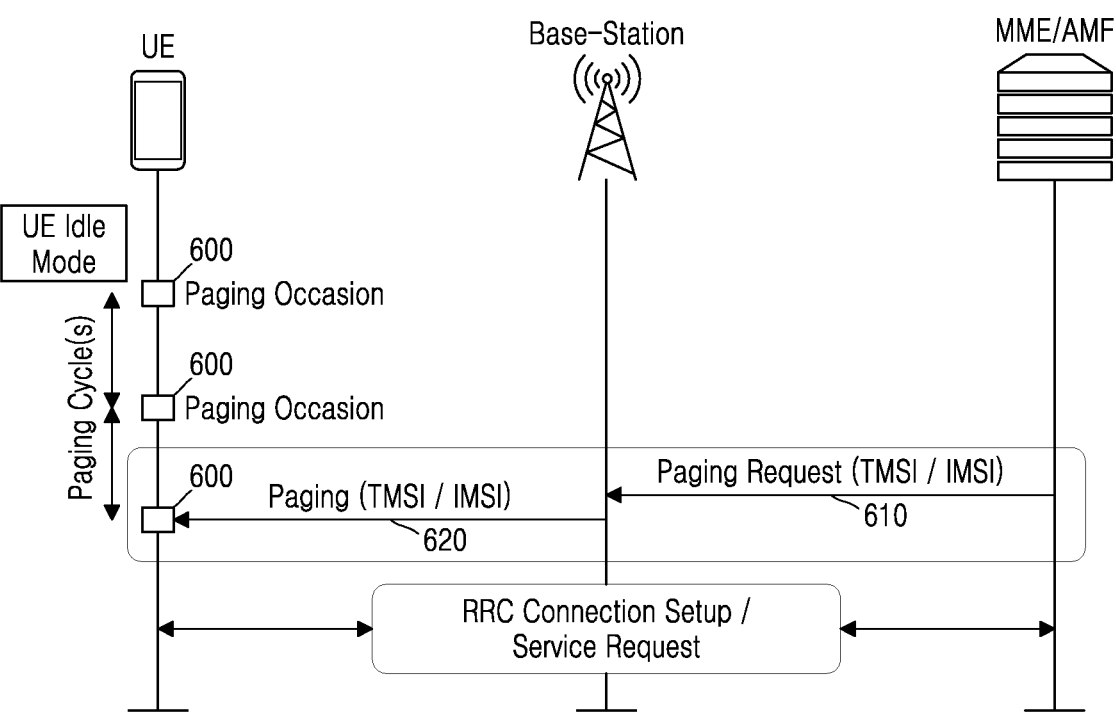
FIG. 6 is a diagram for describing a paging procedure according to one or more embodiments of the disclosure according to one or more embodiments.

FIG. 6 is a diagram for describing a paging procedure according to one or more embodiments of the disclosure.

A network may initiate a paging procedure by transmitting a paging message on a paging occasion 600 of a UE (610, 620). The network may address a plurality of UEs in the paging message by including one paging record for each of the UEs. The network may include one or more temporary mobile group identity (TMGI) in the paging message. At least one of international mobile subscriber identity (IMSI) or temporary mobile subscriber identity (TMSI) may be included in the paging message. The UE may receive a paging message 610 or may receive a paging record.

Figure 7A:
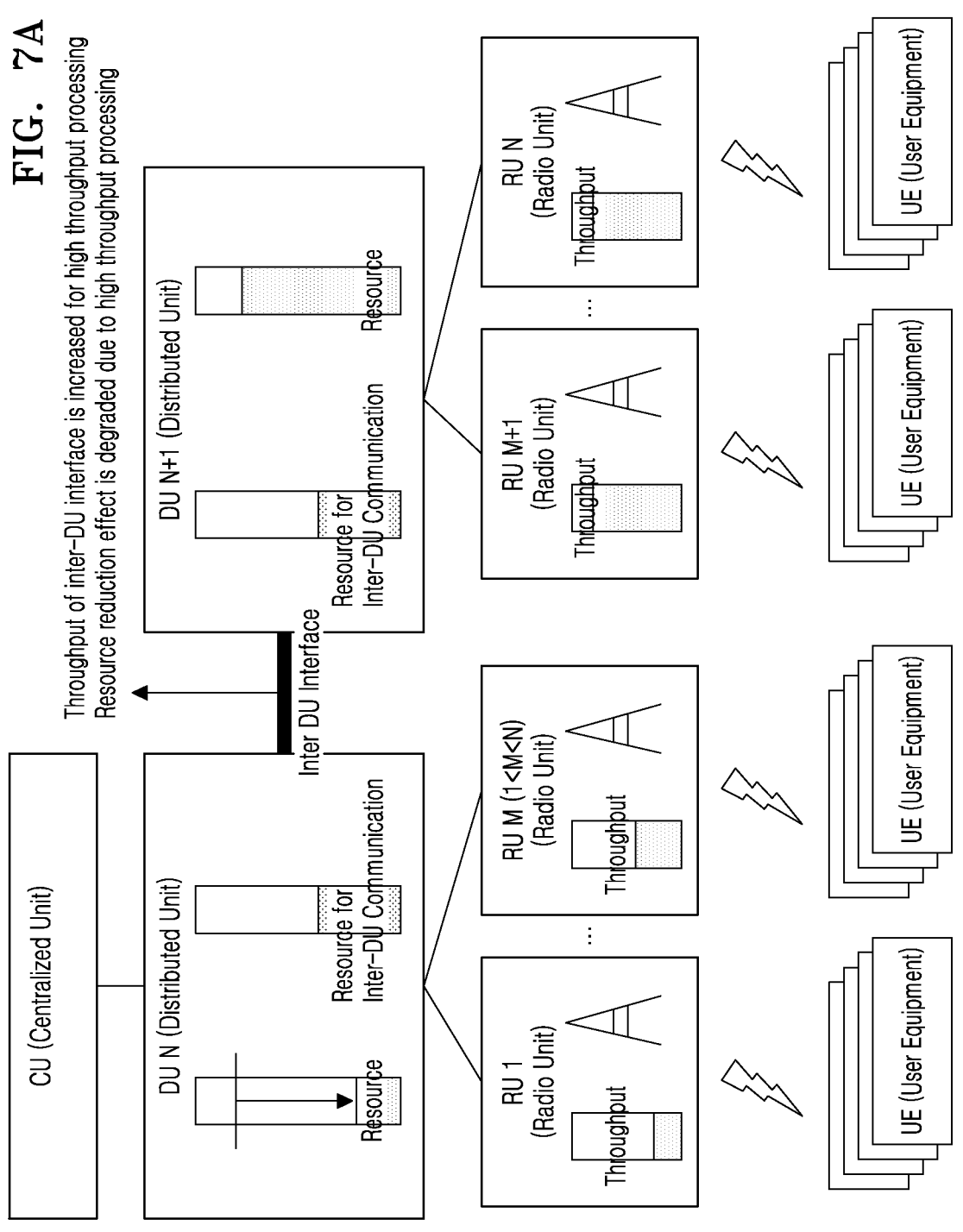
FIGS. 7A and 7B are diagrams for describing a method of performing radio unit (RU) migration, according to one or more embodiments of the disclosure.
Figure 7B:
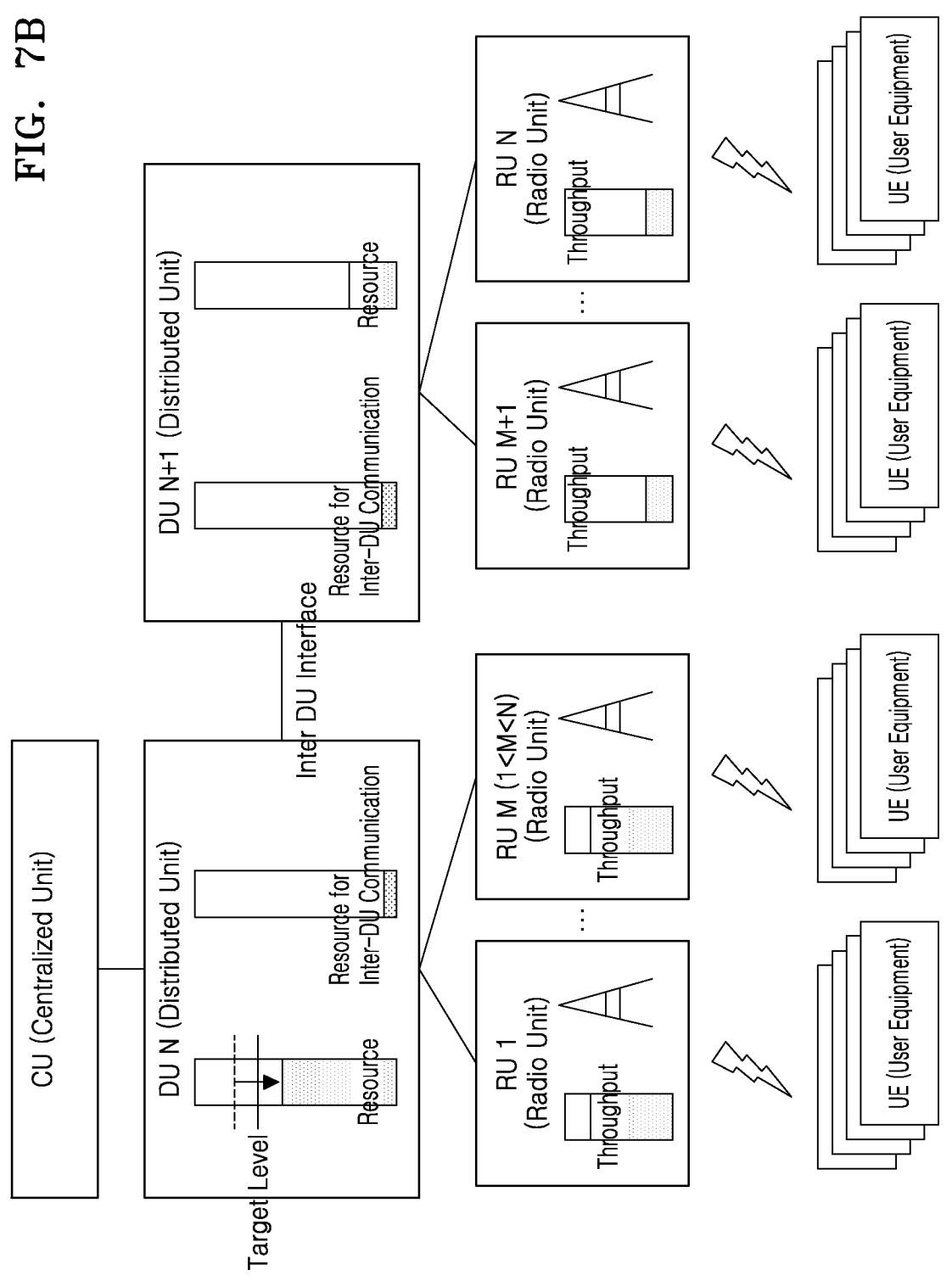

FIGS. 7A and 7B are diagrams for describing a method of performing RU migration, according to one or more embodiments of the disclosure.

A first DU may determine whether RU migration is required, based on information about resource usage of the first DU. In case that the resource usage of the first DU is greater than or equal to a configured value for the resource usage of the first DU, the first DU may determine that RU migration is required. In one or more examples, the resource usage may be determined or calculated based on at least one of CPU usage, memory usage, or Ethernet link usage related to a network of a DU server.

The first DU may select at least one target RU based on information about the throughput of the RU connected to the first DU. The first DU may migrate the target RU to the second DU. The RU determined to be migrated to the second DU may be referred to as the target RU. At least one target RU may be expressed in the form of a RU list or a RU set including an RU ID. For example, the RU set may be expressed as a migration RU set 'Set 1={R1}, Set 2={R1, R2} Set 3={R2, R3}'.

The first DU may obtain information about the throughput of some RUs or information about the throughput of all RUs for at least one RU connected to the first DU, based on the information about the RU. The throughput of the RU may be determined or calculated based on the data transmission/ reception amount of the UE connected to the RU. The data transmission/reception amount of the UE measured by the MAC may be included in the information about the RU. In one or more examples, the throughput of the Inter-DU interface may be determined based on the throughput of the target RU migrated to the second DU.

For example, in case that the first DU is connected to RU 1 and RU 2, UE 1, UE 2, and UE 3 belong to RU 1, and UE 4 belongs to RU 2, the context synchronizer of the first DU may obtain or measure the data transmission/reception amount of UE 1 transmitted/received for a certain time period, the data transmission/reception amount of UE 2, the data transmission/reception amount of UE 3 by using the MAC module of the first DU, and may calculate the through-put of RU 1 by dividing the data transmission/reception amount of all UEs by the certain time period. The throughput of RU 2 may be obtained by dividing the data transmission/reception amount of UE 4 by the certain time period.

In case that the RU is migrated from the first DU to the second DU, the migrated RU may process data through the second DU. In order to comply with the F1 interface standard, the RU may transmit data to the first DU through the inter-DU interface for transmission and reception of data to the CU or a core network (CN).

The RU migrated from the first DU to the second DU may be referred to as a target RU. The resource usage of the first DU may decrease by the resource usage of the target RU for the first DU. In one or more examples, because the target RU may transmit and receive data via the first DU through the inter-DU interface, the throughput of the inter-DU interface may increase in proportion to the throughput of the target RU. The resource usage for inter-DU interface communication may increase in proportion to the throughput of the inter-DU interface.

The resource usage of the target RU for the first DU may be determined, identified, or calculated based on the throughput of the target RU. For example, the resource usage ($R_{RU}$) of the target RU for the first DU may be calculated according to Equation (1) below.

$$R_{RU} = R_{DU} \times \frac{T_{RU}}{T_{DU}} \qquad \text{Equation (1)}$$

Based on the total resource amount ($R_{DU}$) of the first DU, the throughput ($T_{RU}$) of the target RU, and the total through-put ($T_{DU}$) of the first DU, the first DU may calculate the resource usage ($R_{RU}$) of the target RU for the first DU. The total throughput ($T_{DU}$) of the first DU may be understood as the total sum of the throughputs of at least one RU connected to the DU.

For example, referring to FIGS. 5A and 5B, the total throughput of the RUs belonging to the set {RU 1, . . . , RU N} may correspond to the total throughput ($T_{DU}$) of the first DU. In case that the migrated {RU M+1, . . . , RU N} is the target RU, the total sum of the throughputs of the RUs belonging to the {RU M+1, . . . , RU N} set may correspond to the throughput ($T_{RU}$) of the target RU.

In case that the target RU is migrated, the resource usage of the first DU may decrease in proportion to the throughput of the target RU, but the throughput of the inter-DU interface may increase in proportion to the throughput of the target RU. As the throughput of the inter-DU interface increases, the resource usage for inter-DU interface communication may increase. As the throughput of the migrated RU increases, the resource usage for inter-DU interface communication increases and resource saving effects due to scaling-out and RU migration in relation to the resources of the first DU may deteriorate.

According to one or more embodiments of the disclosure, required server resources may be advantageously reduced through DU scaling and power consumption may also be advantageously reduced. Furthermore, the increase in the efficiency of the migration operation may reduce the use of CPU, memory, or Ethernet link resources required for migration that occurs during scaling.

According to one or more embodiments, the first DU may determine the target RU so that the throughput of at least one target RU is less than or equal to the threshold throughput of the inter-DU interface. The throughput of at least one target RU may be understood as the sum of the throughputs of the RUs belonging to the target RU set, and the sum of the throughputs of the RUs belonging to the target RU set may be less than or equal to the threshold throughput of the inter-DU interface. For example, in case that the target RU is RU 1, the throughput of RU 1 is less than or equal to the threshold throughput of the inter-DU interface, and in case that the target RU is {RU 2, RU 3}, the sum of the throughput of RU 2 and the throughput of RU 3 is less than the threshold throughput of the inter-DU interface.

In one or more examples, the threshold throughput is variable. For examples, the threshold throughput of the inter-DU interface may be set based on inter-DU network capacity. For example, as the network capacity increases, the threshold throughput of the inter-DU interface may be set to be higher by a base station operator such as a communication company.

The target RU may be determined so that resource usage of the at least one target RU for the first DU is greater than or equal to a resource usage threshold value. The resource usage threshold value may be set by the operator such as the communication company or the base station, based on resource usage in which the first DU operates stably in the server.

For example, the resource usage threshold value may be a value obtained by subtracting resource usage in which the first DU operates stably in the server from the total resource usage of the first DU and may be set by the operator or the base station. The first DU may select, identify, or determine at least one target RU, based on information about the resource usage of the first DU and information about the throughput of the RU.

The first DU may select the target RU so that the throughput of the at least one target RU is less than or equal to the threshold throughput of the inter-DU interface and the resource usage of the at least one target RU for the first DU is greater than or equal to the resource usage threshold value.

Figure 8:
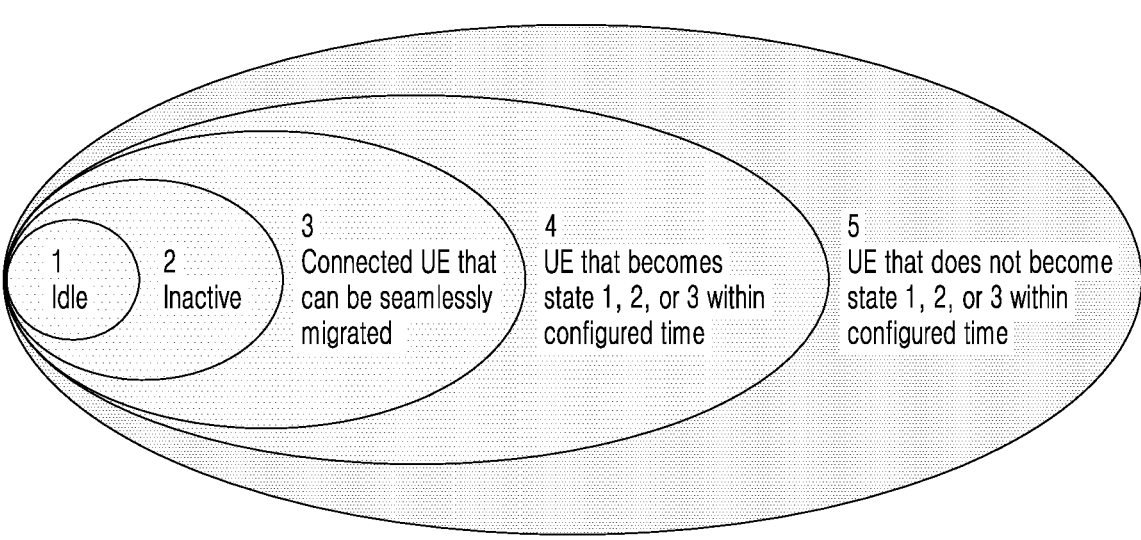
FIG. 8 is a diagram for describing a method of performing UE migration, according to one or more embodiments of the disclosure.

FIG. 8 is a diagram for describing a method of performing UE migration, according to one or more embodiments of the disclosure.

While the UE is migrated from the first DU to the second DU, the UE may not receive a schedule from the MAC. In case that the schedule is not received for a certain time or longer, a radio link failure (RLF) may occur with respect to the UE. The UE for which a RLF has occurred may perform random access (RA). In case that a plurality of UEs simultaneously perform RA, signaling overhead of a base station system may increase and QoS may decrease. In the disclosure, the migration order of UEs is determined. For example, UEs may be migrated one by one, or UEs may be migrated by grouping the UEs into certain groups. Therefore, when the UEs are migrated together, the required migration time may be reduced, the occurrence of RLF be reduced, and a sharp decrease in QoS may be prevented. Furthermore, in the disclosure, the efficiency of resources may be improved and the user's communication interruption experience may be reduced.

Referring to FIG. 8, the first DU may migrate at least one target UE to the second DU, based on at least one of information about the required migration time, the RRC state, or the QoS of the UE connected to the target RU. The target UE may be understood as the UE determined to be migrated. In one or more examples, the term "target UE" may be used herein for convenience of explanation, but may be variously referred to as, for example, a first UE, a migration target UE, and a migration UE, and is not limited to the aforementioned examples. The UE migration may be understood as an operation of transmitting UE-related information. One or more UEs may be migrated together. The UE-related information may include at least one of UE context information or an RLC buffer.

The required migration time of the UE connected to the target RU may be determined or calculated based on at least one of UE context size information, RLC buffer size information, or inter-DU network capacity information. The required migration time of the UE may include a time required to transmit the UE-related information from the first DU to the second DU.

In one or more examples, as the size of the UE context increases, the required migration time of the UE may increase. As the size of the RLC buffer increases, the required migration time of the UE may increase. As the inter-DU network capacity increases, the required migration time of the UE may decrease. For example, in case that the size of the UE context is 100 Kbytes, the size of the RLC buffer is 3,000 Kbytes, and the inter-DU network capacity is 10 Gbps, the time taken to migrate 1,000 UEs from the first DU to the second DU may be calculated as in Equation (2) below.

$$3100 \text{ Kbytes/piece}*1,000/10 \text{ Gbps}=3,100*1,024*1,000*8 \text{ bit}/10*1,024*1,024*1,024 \text{ bit/s}=2.36 \text{ sec} \quad \text{Equation (2)}$$

In one or more examples, the first DU may determine whether to perform migration of the UE connected to the target RU and may determine the migration order of the target UE, based on information about at least one of the required migration time, the RRC state, or the QoS of the UE connected to the target RU.

In one or more examples, the first DU may determine whether to perform migration of the UE connected to the RU and the migration order, based on the required migration time. For example, in case that the required migration time of UE 1 connected to the target RU is longer than a RLF-related threshold time, the first DU may determine to migrate UEs other than UE 1. The first DU may migrate a UE having a required migration time shorter than a RLF-related threshold time.

In one or more examples, the RLF-related threshold time may be determined based on the maximum number of retransmission requests by the RLC and a waiting time for each retransmission request. For example, in case that the maximum number of retransmission requests (maxRetxThreshold) set for UE 1 is 8 and the waiting time for each retransmission request (t-pollRetransmit) is 45 ms, the RLF-related threshold time may be calculated as 8*45=360 ms. In case that the required migration time is shorter than 360 ms, the RLF of the UE may not occur.

The maximum number of retransmission requests (maxRetxThreshold) and the waiting time per each retransmission (t-pollRetransmit) may be set among values defined in the NR specification as shown in Table 1 by a base station operator such as a communication company. For example, retransmission may be set to be requested eight times for every 45 ms by default.

TABLE 1

| |
|---|
| * maxRetxThreshold - default : t8 |
| ENUMERATED { t1, t2, t3, t4, t6, t8, t16, t32 } |
| Parameter for RLC AM in TS 38.322 [4]. |
| Value t1 corresponds to 1 retransmission, value t2 corresponds to 2 |
| retransmissions and so on. |
| * t-pollRetransmit - default : ms45 |
| ENUMERATED { |
| ms5, ms10, ms15, ms20, ms25, ms30, ms35, |
| ms40, ms45, ms50, ms55, ms60, ms65, ms70, |
| ms75, ms90, ms95, ms90, ms95, ms100, ms105, |
| ms110, ms115, ms120, ms125, ms130, ms135, |
| ms140, ms145, ms150, ms155, ms160, ms165, |
| ms170, ms175, ms180, ms185, ms190, ms195, |
| ms200, ms205, ms210, ms215, ms220, ms225, |
| ms230, ms235, ms240, ms245, ms250, ms300, |
| ms350, ms400, ms450, ms500, ms900, ms1000, |
| ms2000, ms4000, ms1-v1610, ms2-v1610, ms3-v1610, |
| ms4-v1610, spare1} |

The first DU may determine whether to perform migration of the UE and the UE migration order, based on the RRC state of the UE connected to the target RU. The first DU may migrate at least one of an idle UE or an inactive UE prior to an active UE. The idle UE or the inactive UE may be converted into an active state without a re-registration process. In case that the idle UE or the inactive UE is migrated, only UE context information may be transmitted, and thus, the required migration time may be shorter than the required migration time in case that the active UE is migrated. The idle UE and the inactive UE may be grouped into one group, and whether to perform migration of the UEs belonging to the group and the UE migration order may be determined and the migration may be subsequently performed. In case that the idle UE and the inactive UE are separately migrated, the idle UE may be migrated prior to the inactive UE. Because the size of the UE context information of the idle UE may be smaller than the size of the UE context information of the inactive UE, and the number of types of paging procedures of the idle UE may be less than the number of types of paging procedures of the inactive UE, the inactive UE may be migrated after the idle UE is migrated.

In case that the RRC state of the UE connected to the target RU corresponds to an idle state or an inactive state, the first DU may migrate at least one of the UE corresponding to the idle state or the UE corresponding to the inactive state, based on at least one of a paging signal period or a required migration time. For example, in case that the time until next paging signal processing is longer than the required migration time, the UE may be migrated. In case that the time until the next paging signal processing is shorter than the required migration time, the corresponding UE context may be migrated after waiting until the next paging signal arrives. In case that the UE migration is performed according to one or more embodiments of the disclosure, RLF generation of the UE may be reduced.

In case that the RRC state of the UE connected to the target RU corresponds to the active state, the migration may be performed on the UE having a required migration time shorter than or equal to a threshold time. In case that the RRC state of the UE is active and the required migration time is longer than the threshold time, whether to perform UE migration may be determined after a set time, based on a second required migration time, and the migration may be performed based on a result of the determining.

The second required migration time may be determined based on UE context size information, RLC buffer size information, or inter-DU network capacity information after the set time. The migration may be performed on the UE having the second required migration time longer than the threshold time. Even after the set time has elapsed, the migration may not be performed on the UE having the second required migration time longer than the threshold time. According to one or more embodiments of the disclosure, the UE having the second required migration time longer than the threshold time may perform RA or migrate to another DU including the second DU.

FIG. 9 is a flowchart of a method of performing RU migration from the first DU to the second DU, according to one or more embodiments of the disclosure.

In operation S910, the first DU may obtain inter-DU interface configuration information for connection to the second DU.

In one or more embodiments of the disclosure, the first DU may receive inter-DU interface configuration information from the OAM 50. The inter-DU interface configuration information may include configuration information for connection between the first DU and the second DU and F1 interface configuration information between the first DU and the CU, and may be transmitted through higher layer signaling or physical layer signaling. In one or more embodiments of the disclosure, the inter-DU interface configuration information may be transmitted from the OAM 50 to the first DU, based on an inter-DU interface configuration information request of the first DU.

In operation S920, the first DU may perform a connection to the second DU, based on the inter-DU interface configuration information. In one or more embodiments of the disclosure, the first DU may perform a connection to one or more DUs. In one or more embodiments of the disclosure, an inter-DU interface between the first DU and the second DU may be configured based on the inter-DU interface configuration information. In one or more embodiments of the disclosure, the first DU may transmit and receive packets to and from the second DU through the inter-DU interface.

The context synchronizer of the first DU may obtain information about resource usage of the first DU. The resource usage of the first DU may be determined or calculated based on at least one of CPU usage, memory usage, or Ethernet link usage related to the network of the DU server.

The first DU may determine whether RU migration is required, based on the information about the resource usage of the first DU. In case that the resource usage of the first DU is greater than or equal to the configured value for the resource usage of the first DU, the first DU may determine that RU migration is required. In case that the first DU determines that RU migration is required, the first DU may perform RU migration with respect to at least one target RU, based on the throughputs of the RUs connected to the first DU. The method of performing RU migration may correspond to the descriptions of FIGS. 7A and 7B, and redundant descriptions thereof may be partially omitted.

In operation S930, the first DU may obtain information about the throughput of the RU connected to the first DU, based on the information about the at least one RU connected to the first DU. In one or more embodiments of the disclosure, the information about the RU may include at least one of cell context information or UE context information. The data transmission/reception amount of the UE may be included in the UE context information.

The throughput of the RU may be determined based on the data transmission/reception amount of the UE connected to the RU. The first DU may obtain information about the throughputs of some RUs or information about the throughputs of all RUs for at least one RU connected to the first DU.

In operation S940, the first DU may select, identify, or determine at least one target RU, based on the information about the throughput of each of the RUs.

The target RU may be understood as a RU that the first DU has determined to migrate to the second DU. The at least one target RU may be expressed in the form of a RU list or a RU set including an RU ID. The first DU may determine the target RU so that the throughput of the at least one target RU is less than or equal to the threshold throughput of the inter-DU interface. For example, the sum of the throughputs of the RUs belonging to the target RU set may be less than or equal to the threshold throughput of the inter-DU interface.

The threshold throughput of the inter-DU interface may be set based on inter-DU network capacity. For example, as the network capacity increases, the threshold throughput of the inter-DU interface may be set to be higher by a base station operator such as a communication company.

The target RU may be determined so that resource usage of the at least one target RU for the first DU is greater than or equal to a resource usage threshold value. The resource usage threshold value may be set by the operator such as the communication company or the base station, based on resource usage in which the first DU operates stably in the server. For example, the resource usage threshold value may be a value obtained by subtracting resource usage in which the first DU operates stably in the server from the total resource usage of the first DU and may be set by the operator or the base station.

The resource usage of the target RU for the first DU may be determined, identified, or calculated based on the throughput of the target RU. For example, the resource usage ($R_{RU}$) of the target RU for the first DU may be calculated according to Equation (1) discussed above.

The first DU may select, identify, or determine at least one target RU, based on information about the resource usage of the first DU and information about the throughput of the RU.

In operation S950, the first DU may migrate the target RU to the second DU.

In one or more embodiments of the disclosure, the first DU may transmit information about the RU from the first DU to the second DU. The information about the RU may include at least one of cell context information or UE context information.

The first DU may migrate at least one target UE to the second DU, based on at least one of information about the required migration time, the RRC state, or the QoS of the UE connected to the target RU. The target UE may be understood as the UE determined to be migrated. In the disclosure, the term "target UE" is used herein for convenience of explanation, but may be variously referred to as, for example, a first UE, a migration target UE, and a migration UE, and is not limited to the aforementioned examples.

The UE migration may be understood as an operation of transmitting UE-related information. The UE-related information may include at least one of UE context information or an RLC buffer. The first DU may perform one or more UEs together. The method of performing migration may correspond to the description of FIG. 8, and redundant descriptions thereof may be partially omitted.

The required migration time of the UE connected to the target RU may be determined or calculated based on at least one of UE context size information, RLC buffer size information, or inter-DU network capacity information. The required migration time of the UE may include a time required to transmit the UE-related information from the first DU to the second DU.

As the size of the UE context increases, the required migration time of the UE may increase. As the size of the RLC buffer increases, the required migration time of the UE may increase. As the inter-DU network capacity increases, the required migration time of the UE may decrease.

For example, in case that the size of the UE context is 100 Kbytes, the size of the RLC buffer is 3,000 Kbytes, and the inter-DU network capacity is 10 Gbps, the time taken to migrate 1,000 UEs from the first DU to the second DU may be calculated as in Equation (2) discussed above.

The first DU may determine whether to perform migration of the UE connected to the target RU and may determine the migration order of the target UE, based on at least one of information about the required migration time, the RRC state, or the QoS of the UE connected to the target RU.

The first DU may determine whether to perform migration of the UE connected to the RU and the migration order, based on the required migration time. For example, in case that the required migration time of UE 1 connected to the target RU is longer than a RLF-related threshold time, the first DU may determine to migrate UEs other than UE 1. The migration may be performed on a UE having a required migration time shorter than a RLF-related threshold time. The RLF-related threshold time may be determined based on the maximum number of retransmission requests in RLC and a waiting time for each retransmission request.

The first DU may determine whether to perform migration of the UE and the UE migration order, based on the RRC state of the UE connected to the target RU. The first DU may migrate at least one of an idle UE or an inactive UE prior to an active UE. The idle UE or the inactive UE may be converted into an active state without a re-registration process. In case that the idle UE or the inactive UE is migrated, only UE context information may be transmitted, and thus, the required migration time may be shorter than the required migration time in case that the active UE is migrated.

The idle UE and the inactive UE may be grouped into one group, and whether to perform migration of the UEs belonging to the group and the UE migration order may be determined and the migration may be then performed. In case that the idle UE and the inactive UE are separately migrated, the idle UE may be migrated prior to the inactive UE. Because the size of the UE context information of the idle UE may be smaller than the size of the UE context information of the inactive UE and the number of types of paging procedures of the idle UE may be less than the number of types of paging procedures of the inactive UE, the inactive UE may be migrated after the idle UE is migrated.

In case that the RRC state of the UE connected to the target RU corresponds to an idle state or an inactive state, the first DU may migrate at least one of the UE corresponding to the idle state or the UE corresponding to the inactive state, based on at least one of a paging signal period or a required migration time. For example, in case that the time until next paging signal processing is longer than the required migration time, the UE may be migrated. In case that the time until the next paging signal processing is shorter than the required migration time, the corresponding UE context may be migrated after waiting until the next paging signal arrives. In case that the UE migration is performed according to one or more embodiments of the disclosure, RLF generation of the UE may be reduced.

In case that the RRC state of the UE connected to the target RU corresponds to the active state, the migration may be performed on the UE having a required migration time shorter than or equal to a threshold time. In case that the RRC state of the UE is active and the required migration time is longer than the threshold time, whether to perform UE migration may be determined after a set time, based on a second required migration time, and the migration may be performed based on a result of the determining.

The second required migration time may be determined based on UE context size information, RLC buffer size information, or inter-DU network capacity information after the set time. The migration may be performed on the UE having a second required migration time longer than or equal to a threshold time. Even after the set time has elapsed, the migration may not be performed on the UE having the second required migration time longer than the threshold time. According to one or more embodiments of the disclosure, the UE having the second required migration time longer than the threshold time may perform RA or migrate to another DU including the second DU.

According to one or more embodiments of the disclosure, overhead generation of the first DU may be reduced, and communication interruption with the UE may be reduced. In addition, resource use efficiency of DUs may be improved and QoS degradation of UEs may be reduced. By making the migration operation efficient, resource use required for migration may be reduced.

Figure 10:
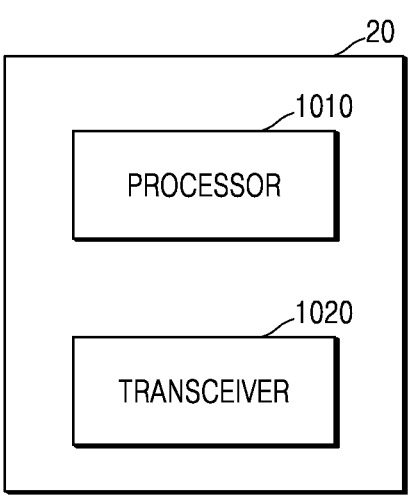
FIG. 10 is a schematic block diagram of a DU according to one or more embodiments of the disclosure.

FIG. 10 is a schematic block diagram of a DU 20 according to one or more embodiments of the disclosure.

Referring to FIG. 10, the DU 20 according to the disclosure may include a processor 1010, a transceiver 1020, and a memory. However, the elements of the DU 20 are not limited to the example described above. For example, the DU 20 may include more elements than the elements described above or may include fewer elements than the elements described above. In one or more embodiments of the disclosure, the processor 1010, the memory, and the transceiver 1020 may be implemented as a single chip.

The processor 1010 may be implemented with one or more processors. In this case, the one or more processors may be a CPU, an application processor (AP), a DSP, or the like.

The processor 1010 may control a series of processes so that the DU 20 is able to operate according to the above-described embodiment of the disclosure. For example, the processor 1010 may receive a control signal and a data signal through the transceiver 1020 and may process the received control signal and the received data signal. The processor 1010 may transmit the processed control signal and the processed data signal through the transceiver 1020 and may detect an event. Furthermore, the processor 1010 may perform control so that input data derived from the received control signal and the received data signal is processed according to a predefined operation rule or an artificial intelligence model, which is stored in the memory. The processor 1010 may write data to and read data from the memory. The processor 1010 may perform functions of a protocol stack required in communication standards. According to one or more embodiments of the disclosure, the processor 1010 may include at least one processor. In one or more embodiments of the disclosure, a part of the transceiver 1020 or the processor 1010 may be referred to as a communication processor (CP). The processor 1010 can activate or deactivate the F1 handler, the F1 splitter, and the inter-DU handler of the DU 20 and may configure the inter-DU interface, according to the above-described embodiments of the disclosure.

The memory may store programs and data necessary for the operation of the DU 20. Furthermore, the memory may store control information or data included in the signals obtained by the DU 20. In addition, the memory may store the predefined operation rule or the artificial intelligence model used in the DU 20. The memory may include a storage medium, such as read-only memory (ROM), random access memory (RAM), hard disk, compact disc read-only memory (CD-ROM), and digital versatile disc (DVD), or any combination thereof. Furthermore, the memory may not exist separately and may be included in the processor 1010. The memory may include a volatile memory, a non-volatile memory, or a combination of a volatile memory and a non-volatile memory. The memory may provide the stored data in response to the request of the processor 1010.

The transceiver 1020 collectively refers to a transmitter and a receiver, and the transceiver 1020 of the DU 20 may transmit and receive signals to and from a base station or a network entity. The transmitted or received signals may include control information and data. To this end, the transceiver 1020 may include a radio frequency (RF) transmitter that performs up-conversion and amplification on a frequency of a signal to be transmitted, and an RF receiver that performs low noise amplification on a received signal and performs down-conversion on a frequency of the received signal. However, this is only one or more embodiments of the transceiver 1020, and the elements of the transceiver 1020 are not limited to the RF transmitter and the RF receiver. Furthermore, the transceiver 1020 may receive a signal through a radio channel, output the received signal to the processor 1010, and transmit an output signal of the processor 1010 through the radio channel. The transceiver 1020 may transmit and receive data between DUs through an inter-DU interface.

The first DU may obtain inter-DU interface configuration information for connection to the second DU. The first DU may perform a connection to the second DU, based on the inter-DU interface configuration information. The first DU may obtain information about the throughputs of the respective RUs based on information about at least one RU connected to the first DU. The first DU may select at least one target RU based on information about the throughputs of the respective RUs. The target RU may be migrated to the second DU.

According to one or more embodiments of the disclosure, the first DU may determine whether to perform migration of the RU connected to the first DU, based on information about the resource usage of the first DU. The resource usage of the first DU may be determined based on at least one of CPU usage, memory usage, or Ethernet link usage.

The throughputs of the respective RUs may be determined based on the data transmission/reception sizes of the UEs connected to the respective RUs. The throughput of the at least one target RU may be less than or equal to the threshold throughput of the inter-DU interface.

The resource usage of the at least one target RU for the first DU may be greater than or equal to the resource usage threshold value. The resource usage of the target RU for the first DU may be determined based on the throughput of the target RU.

At least one target UE may be migrated to the second DU based on information about at least one of the RRC state, the required migration time, or the QoS of the UE connected to the target RU.

The required migration time of the UE connected to the target RU may be determined based on at least one of UE context size information, RLC buffer size information, or inter-DU network capacity information.

In case that the RRC state of the UE connected to the target RU corresponds to an idle state, the migration may be performed on the UE corresponding to the idle state. In case that the RRC state of the UE connected to the target RU corresponds to an inactive state, the migration may be performed on the UE corresponding to the inactive state based on a paging signal period and a required migration time. In case that the RRC state of the UE connected to the target RU corresponds to an active state, the migration may be performed on the UE having a required migration time shorter than or equal to a threshold time. The threshold time may be determined based on the maximum number of retransmission requests by RLC and a waiting time for each retransmission request. After a configured time has elapsed, the migration may be performed on the UE among the UEs connected to the target RU. In case that the required migration time of the first UE connected to the target RU is longer than the threshold time, the migration may be performed on UEs other than the first UE among the UEs.

According to one or more embodiments of the disclosure, the first DU may include a transceiver and at least one processor. The at least one processor may obtain inter-DU interface configuration information for connection to the second DU. The at least one processor may perform a connection to the second DU based on the inter-DU interface configuration information. The at least one processor may obtain information about the throughputs of the respective RUs based on information about the at least one RU connected to the first DU. The at least one processor may select at least one target RU based on the information about the throughputs of the respective RU. The at least one processor may migrate the at least one target RU to the second DU.

A machine-readable storage medium may be provided in the form of a non-transitory storage medium. The "non-transitory storage medium" is a tangible device and only means not including a signal (e.g., electromagnetic waves). This term does not distinguish between a case where data is semi-permanently stored in a storage medium and a case where data is temporarily stored in a storage medium. For example, the non-transitory storage medium may include a buffer in which data is temporarily stored.

According to one or more embodiments of the disclosure, the methods according to various embodiments of the disclosure may be provided by being included in a computer program product. The computer program products may be traded between a seller and a buyer as commodities. The computer program product may be distributed in the form of a machine-readable storage medium (e.g., CD-ROM), or may be distributed (e.g., downloaded or uploaded) online either via an application store or directly between two user devices (e.g., smartphones). In the case of the online distribution, at least a part of a computer program product (e.g., downloadable app) is stored at least temporarily on a machine-readable storage medium, such as a server of a manufacturer, a server of an application store, or a memory of a relay server, or may be temporarily generated.

What is claimed is:

1. A method, performed by a first distributed unit (DU), of performing communication in a wireless communication system, the method comprising:

obtaining inter-DU interface configuration information for connection to a second DU;

performing the connection to the second DU based on the inter-DU interface configuration information;

identifying whether to perform migration for at least one radio unit (RU) connected to the first DU, based on information about a resource usage of the first DU, identifying a throughput of data of the at least one RU connected to the first DU;

selecting at least one target RU based on the information about the throughput of data of the at least one RU; and performing migration of the at least one target RU from the first DU to the second DU.

2. The method of claim 1, wherein the resource usage of the first DU is identified based on at least one of a central processing unit (CPU) usage, a memory usage, or an Ethernet link usage.

3. The method of claim 1, wherein the throughput of data of the at least one RU is identified based on a data transmission/reception size of a user equipment (UE) connected to the at least one RU.

4. The method of claim 1, wherein the throughput of data of the at least one target RU is less than or equal to a threshold throughput of data of an inter-DU interface.

5. The method of claim 1, wherein a resource usage of the at least one target RU for the first DU is greater than or equal to a resource usage threshold value, and wherein the resource usage of the at least one target RU for the first DU is identified based on the throughput of data of the at least one target RU.

6. The method of claim 1, further comprising performing migration of at least one target UE from the first DU to the second DU based on information about at least one of a radio resource control (RRC) state, a required migration time, or a quality of service (QoS) of at least one UE connected to the at least one target RU.

7. The method of claim 6, wherein the required migration time of the at least one UE connected to the at least one target RU is identified based on at least one of UE context size information, radio link control (RLC) buffer size information, or inter-DU network capacity information.

8. The method of claim 6, wherein the performing migration of the at least one target UE comprises, based on the RRC state of a UE connected to the at least one target RU corresponding to an idle state or an inactive state, migrating the UE corresponding to the idle state before another UE corresponding to the inactive state.

9. The method of claim 6, wherein the performing migration of the at least one target UE comprises, based on the RRC state of a UE connected to the at least one target RU corresponding to an inactive state, migrating the UE corresponding to the inactive state from the first DU to the second DU based on a paging signal period and the required migration time.

10. The method of claim 6, wherein the performing migration of the at least one target UE comprises, based on the RRC state of a UE connected to the at least one target RU corresponding to an active state, migrating the UE having the required migration time less than or equal to a threshold time, and wherein the threshold time is identified based on a maximum number of retransmission requests for a RLC layer and a waiting time for each retransmission request.

11. The method of claim 10, further comprising, after a configured time has elapsed, migrating a UE, among a plurality of UEs connected to the at least one target RU, from the first DU to the second DU.

12. The method of claim 1, further comprising, based on a required migration time of a first UE connected to the at least one target RU being greater than or equal to a threshold time, migrating one or more UEs other than the first UE among a plurality of UEs from the first DU to the second DU.

13. A first distributed unit (DU) for performing communication in a wireless communication system, the first DU comprising:

a transceiver; and at least one processor operatively connected to the transceiver and configured to:

obtain inter-DU interface configuration information for connection to a second DU;

perform the connection to the second DU based on the inter-DU interface configuration information;

identify whether to perform migration for at least one radio unit (RU) connected to the first DU, based on information about a resource usage of the first DU;

identify information about a throughput of data of at least one radio unit (RU) connected to the first DU based on information about the at least one RU connected to the first DU;

select at least one target RU based on the information about the throughput of the data of at least one RU; and perform migration of the at least one target RU from the first DU to the second DU.

14. The first DU of claim 13, wherein the at least one processor is further configured to:

identify the resource usage of the first DU based on at least one of a central processing unit (CPU) usage, a memory usage, or an Ethernet link usage.

15. The first DU of claim 13, wherein the throughput of the data of at least one RU is identified based on a data transmission/reception size of a user equipment (UE) connected to the at least one RU.

16. The first DU of claim 13, wherein the throughput of data of the at least one target RU is less than or equal to a threshold throughput of an inter-DU interface.

17. The first DU of claim 13, wherein a resource usage of the at least one target RU for the first DU is greater than or equal to a resource usage threshold value, and wherein the resource usage of the at least one target RU for the first DU is identified based on a throughput of data of the at least one target RU.

18. The first DU of claim 13, wherein the at least one processor is further configured to:

perform migration of at least one target UE from the first DU to the second DU based on information about at least one of a radio resource control (RRC) state, a required migration time, or a quality of service (QoS) of at least one UE connected to the at least one target RU.

19. The first DU of claim 18, wherein the required migration time of the at least one UE connected to the at least one target RU is identified based on at least one of UE context size information, radio link control (RLC) buffer size information, or inter-DU network capacity information.

20. The first DU of claim 13, wherein, based on a RRC state of a UE connected to the at least one target RU corresponding to an idle state or an inactive state, the UE corresponding to the idle state is migrated before another UE corresponding to the inactive state.

* * * * *